United States Patent [19]
Katz

[11] Patent Number: 5,351,285
[45] Date of Patent: Sep. 27, 1994

[54] MULTIPLE FORMAT TELEPHONIC INTERFACE CONTROL SYSTEM

[75] Inventor: Ronald A. Katz, Los Angeles, Calif.

[73] Assignee: First Data Resources Inc., Omaha, Nebr.

[21] Appl. No.: 47,241

[22] Filed: Apr. 13, 1993

Related U.S. Application Data

[63] Continuation of Ser. No. 509,691, Apr. 16, 1990, abandoned, and a continuation-in-part of Ser. No. 640,337, Jan. 11, 1991, which is a continuation of Ser. No. 335,923, Apr. 10, 1989, which is a continuation of Ser. No. 194,258, May 16, 1988, Pat. No. 4,845,739, which is a continuation-in-part of Ser. No. 18,244, Feb. 24, 1987, Pat. No. 4,792,968, which is a continuation-in-part of Ser. No. 753,299, Jul. 10, 1985, abandoned, said Ser. No. 509,691, is a continuation-in-part of Ser. No. 260,104, Oct. 20, 1988, Pat. No. 4,930,150, which is a continuation-in-part of Ser. No. 18,244, Feb. 24, 1987, Pat. No. 4,792,968, which is a continuation-in-part of Ser. No. 753,299, Jul. 10, 1985, abandoned.

[51] Int. Cl.[5] .......................................... H04M 11/00
[52] U.S. Cl. ........................................ 379/94; 379/95; 379/97; 379/88; 379/142
[58] Field of Search ...................... 379/94, 97, 96, 98, 379/93, 142, 95, 88, 91, 92

[56] References Cited

U.S. PATENT DOCUMENTS

| | | | |
|---|---|---|---|
| 4,320,256 | 3/1982 | Freeman . | |
| 4,757,267 | 7/1988 | Riskin | 379/97 |
| 4,785,408 | 11/1988 | Britton et al. | 379/97 |
| 4,797,911 | 1/1989 | Szlam et al. . | |
| 4,812,843 | 3/1989 | Champion et al. . | |
| 5,001,710 | 3/1991 | Gawrys et al. | 379/94 |
| 5,017,917 | 5/1991 | Fisher et al. | 379/95 |
| 5,097,528 | 3/1992 | Gursahaney et al. | 379/142 |

FOREIGN PATENT DOCUMENTS 0342295 11/1989 European Pat. Off. .... H04M 11/00

OTHER PUBLICATIONS

Conversant 1 Voice System: Architecture and Applications, by Robert J. Perdue and Eugene L. Rissanen, ATT Technical Journal, Sep./Oct., 1986, vol. 65, No. 5.
The AT&T Multi-Mode Voice Systems-Full Spectrum Solutions for Speech Processing Applications, by S. D. Hester, et al., from the Proceedings of the 1985 AVIOS Conference, Sep., 1985.

*Primary Examiner*—Curtis Kuntz
*Assistant Examiner*—Stella L. Woo

[57] ABSTRACT

Call data signals actuated by a telephone terminal are provided from a telephone communication system to indicate call data as the called number, the calling number and the calling equipment. The call data signals address related control functions for selectively interfacing a live operator terminal or a multiple format multiple port data processing system. The interface connection involves providing a specific format as for automated processing or to prompt an operator. Screening tests and format selection are performed to make a determination. Individual telephone terminals and individual data formats are arranged and interfaced under controlled conditions specified by the call data. Time tests, history tests and demographic tests may be executed in addition to basic selection and qualification tests. Control may be executed from active data storage for assembled control words and record words. Record words for individual calls may be stored along with developed data.

67 Claims, 5 Drawing Sheets

MULTIPLE FORMAT TELEPHONIC INTERFACE CONTROL SYSTEM

RELATED SUBJECT MATTER

This is a continuation of application Ser. No. 07/509,691 filed Apr. 16, 1990 and entitled "Telephone Interface Control System", now abandoned, which is a continuation-in-part of application Ser. No. 260,104 filed Oct. 20, 1988 and entitled "Telephonic Interface Control System", now U.S. Pat. No. 4,930,150 which is a continuation-in-part of application Ser. No. 018,244 filed Feb. 24, 1987 and entitled "Statistical Analysis System For Use With Public Communication Facility", now U.S. Pat. No. 4,792,968, which was a continuation-in-part of application Ser. No. 753,299 filed Jul. 10, 1985 and entitled "Statistical Analysis System For Use With Public Communication Facility", now abandoned. Also, this application is a continuation-in-part of application Ser. No. 07/640,337 filed Jan. 11, 1991, and entitled "Telephonic-Interface Statistical Analysis System", which is a continuation of application Ser. No. 07/335,923 filed Apr. 10, 1989, and entitled "Telephonic-Interface Statistical Analysis System", which is a continuation of application Ser. No. 07/194,258 filed May 16, 1988, and entitled "Telephonic-Interface Statistical Analysis System", now U.S. Pat. No. 4,845,739, which is a continuation-in-part of application Ser. No. 018,244 filed Feb. 24, 1987 and entitled "Statistical Analysis System For Use With Public Communication Facility", now U.S. Pat. No. 4,792,968, which is a continuation-in-part of application Ser. No. 753,299 filed Jul. 10, 1985, and entitled "Statistical Analysis System For Use With Public Communication Facility", now abandoned. The benefit of the earlier filing dates in the United States is claimed under 35 U.S.C. §120.

BACKGROUND AND SUMMARY OF THE INVENTION

Over the past several years, substantial expansion has occurred in the technology of combining telephonic and computer systems. For example, telephone systems have been developed to readily transmit digital data. Various forms of modems are in widespread use to intercouple telephones and computers. However, at a more personal level, it also has been proposed to utilize the traditional dialing buttons of telephone instruments to provide digital data, as for various processing. In accordance with such arrangements, voice messages prompt callers to provide data by actuating the alphanumeric buttons of conventional telephones. These systems have been proposed in association with computers to provide various services and one such system is disclosed in U.S. Pat. No. 4,792,968, issued Dec. 20, 1988, to Ronald A. Katz from an application Ser. No. 018,244 filed Feb. 24, 1987.

With respect to telephonic-computer systems, attaining the interface format desired by an individual caller is sometimes complex and burdensome. Specifically, callers may be misdirected, screening may be ineffective and delays may be cumbersome. Also, records may be poor or non-existent. Furthermore, some situations exist where interface to a live operator is an important alternative. As a consequence, a need exists for an improved interface system for selectively interfacing a considerable number of individual callers with a multiple format processor, as to attain efficient and economical digital and vocal exchanges along with prompting and data accumulation.

In general, the present invention comprises a telephonic-computer interface system accommodating digital and vocal (analog) telephonic communication and capable of handling a large number of calls to selectively interface prompted live-operator stations or formats in a computer processor. The selected interface is controlled, as by call (called number, calling number, etc.) and can be altered under control of an operator, developed data or operating conditions. Accordingly, the system of the present invention interfaces: (1) a telephonic communication facility including remote terminals for individual callers, e.g. conventional telephone instruments including voice communication means, and digital input means in the form of alphanumeric buttons for providing data and (2) either a prompted live-operator station or a multiple port, multiple format data processor for concurrently processing data from a substantial number of callers with respect to any of several formats.

The interface system incorporates a controller for receiving calls from remote terminals for association with ports in the telephonic computer apparatus, and which receives signal-represented call data (representing "calling" and "called" telephone numbers) along with equipment information. An index apparatus is controlled, as by the signal-represented call data, to select initially a live-operator or machine format of the processor so as to specify any conditions for the interface, at least one of the formats including at least one condition. A test apparatus may determine whether or not an individual call attains specified conditions and thereby controls switching structure for providing the actual interface. If a live-operator terminal is selected, or indicated as a secondary format, prompt data is provided to a select station. Data is recorded and processing procedures also may be controlled by call data.

BRIEF DESCRIPTION OF THE DRAWINGS

In the drawings, which constitute a part of this specification, an exemplary embodiment exhibiting various objectives and features hereof is set forth, specifically.

DESCRIPTION OF THE ILLUSTRATIVE EMBODIMENT

As required, a detailed illustrative embodiment of the present invention is disclosed herein. However, physical communication systems, data formats, and operating structures in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
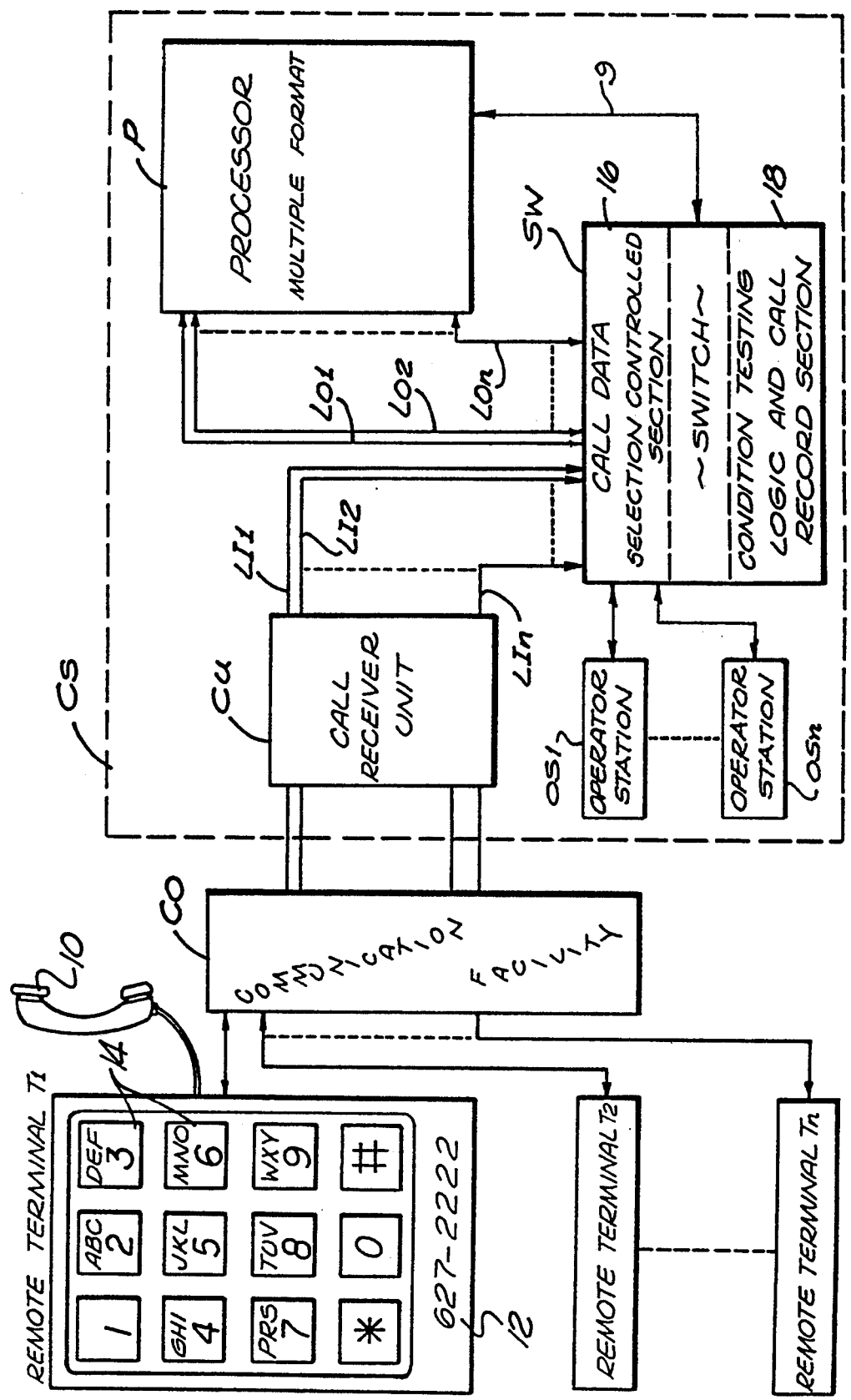
FIG. 1 is a block diagram of a system constructed in accordance with the present invention.

Referring initially to FIG. 1, a series of remote terminals T1-Tn (telephone instruments) are represented (left). The terminals T1-Tn are generally similar and accordingly only the terminal T1 is shown in any detail. The indicated terminals T1-Tn represent the multitude of telephone terminals existing in association with a communication facility CO which may comprise a comprehensive public telephone network.

The communication facility CO, along with the individual terminals T1-Tn, is coupled to a central processing station CS generally indicated by a dashed-line block. Generally with regard to the station CS, individual terminals T1-Tn are interfaced either with a processor P (upper right) or one of several live-operator stations OS1-OSn (lower left) through a call receiver unit CU and a switch SW. Essentially, the processor P and the switch SW cooperate (line 9) to control interfaces, with the processor P providing interface formats either (or both) to automate an interface or prompt a live operator at a station OS1-OSn. Note that the interface formats are stored as described below in the processor P.

In accordance herewith, individual telephone calls are preliminarily processed on the basis of signal-represented call data to identify a specific operating format for a station or the processor P. The preliminary processing may invoke screening tests to impose conditions or establish a test criteria for the switch SW to determine the acceptability of the call to interface with a specific operating format.

Calls are selectively processed according to a specific operating format as indicated by call data. At any instant of time, the collective interface may involve several thousand calls simultaneously being processed through ports of the processor P. Exemplary selected formats of the processor might include: public polls, lotteries, auctions, promotions, sales operations and games. Accordingly, the stations OS1-OSn may comprise a substantial number and the processor P may take the form of a sizable computer capable of simultaneously processing many calls involving several different formats. Although numerous possible configurations are available, for purposes of explanation, the processor P is illustrated simply as a block with multiple ports. Note that while the switch SW and the processor P may be integrated in a single system, they are separately illustrated to isolate the detailed structure and process of the present invention.

Input lines LI1 through LIn from the call receiver unit CU enter the switch SW to provide calling data and communication paths. Output lines LO1 through LOn function between the switch SW and the processor P as lines LS1-LSn operate to serve the stations OS-1-OSn. Note that various multiplexing techniques are well known in the telephonic art to communicate call data and may be employed in the system.

Considering the system somewhat summarily, individual calls originating at the terminals T1-Tn are coupled through the communication facility CO and the call receiver unit CU to the switch SW. Call data, representative of calls, actuates the switch SW to preliminarily process each call based on the desired format. For example, depending on the desired format (indicated by the called number and/or the equipment data signals) calls are selectively coupled and processed. Furthermore, record data is assembled for storage.

Considering the system of FIG. 1 in somewhat greater detail, the exemplary telephone terminal T1 includes a handpiece 10 (microphone and earphone) and a panel 12 provided with a rectangular array of push buttons 14 in a conventional configuration. Of course, the handpiece 10 accommodates analog signals while the panel 12 is a digital apparatus. Generally, the handpiece 10 serves to manifest analog or voice signals to a caller.

In accordance with conventional telephone structure, alphabetic and numeric designations are provided on the buttons 14. For example, several of the buttons 14 carry three letters along with a decimal digit. Specifically, the button designated with the numeral "2" also carries the letters "A", "B" and "C". Thus, the buttons 14 encompass the numerals "0–9" two symbols, and the alphabet except for the letters "Q" and "Z". Consequently, the buttons 14 substantially accommodate the entry of decimal and alphabetic data.

At this stage, some specific aspects of the communication facility CO are noteworthy. Essentially, with telephonic dialing, the communication facility CO couples selective terminals (from the multitude of terminals T1-Tn) to the call receiver unit CU. In that regard, the unit CU at the central station CS may be reached by any of a plurality of called numbers. For example, the call unit CU might be reached by any of twenty telephone dialing numbers, each associated with a specific operating format of the processor P. One called number or set of numbers might be associated with an auction format of the processor P. Another number or set of numbers might be associated with sales operating formats. Still another called number or set of numbers might identify a game format, and so on.

Incoming calls to the call receiver unit CU are identified by call data in accordance with telephone system techniques. As described below, the call data may specifically include digital signals representative of the called number (DNIS), the calling number (ANI) (terminal number), and the terminal equipment.

In addition to attaining a preliminary interface with a selected format, individual calls may be screened based on the called number (identifying an operating format) and the calling number (caller identification) or the equipment. That is, the system of the present invention is based on a realization that signal-represented call data can be effectively utilized to selectively interface individual callers at remote terminals with specific operating formats of a data processor.

Considering the call data in somewhat greater detail, in accordance with current telephone systems, the communication facility CO may provide signal-represented call data for: the "called" number, the "calling" number, and the equipment involved, e.g. "pulse" or "tone" terminal. Specifically, operating telephone equipment termed "DNIS" automatically provides the called telephone number in digital form from the communication facility CO. Somewhat similarly, existing telephonic equipment designated "ANI" automatically indicates the caller's (calling) number in digital signal represented form. Generally, time shared lines carry such call data and also may provide call data indicating equipment. Thus, the call unit CU may receive the called number, the calling number, and a calling equipment designation (pulse or tone), collectively termed call data, which data is utilized to establish control functions, as for example to select an operating format for a station OS-1–OSn or the processor P.

As described in detail below, call data is registered in the switch SW to perform distinct control operations. Specifically, a selection section 16 of the switch SW identifies a specific desired format for the stations OS-1–OSn or the processor P. Depending on the format, a testing section 18 of the switch SW may screen calls for interface connections.

Recognizing that the possibilities are great, formats for calls in accordance with the disclosed embodiment may be of three different classes. Specifically, call formats may specify any of the following operations:

1. couple to live operator station if possible or in accordance with a predetermined criteria; if no operator station available, couple to processor;
2. interface to processor;
3. either above format, but selectively re-couple to live operator station or processor depending on secondary conditions.

The ramifications of individual formats within the above classes may vary considerably; however, some examples will illustrate possibilities. A marketing format (class 1) might interface callers to a live operator if an operator is available. Upon receiving a call, the operator station OS1–OSn (FIG. 1) also receives and displays prompting format data for the attending operator. If an operator is not available (all stations OS1–OSn busy) the system provides an interface with the processor P and a format as to record the data for a return call by an operator. Alternatively, the processor completes the transaction with data provided by the caller that may be digital, digital and voice, or voice.

In a game format, say of class 2, a caller may be limited to interface the processor P. The interface may be contingent on initial test conditions, e.g. call data, caller record, time, etc.

Formats of class 3 involve a switch between live operator and processor depending on secondary conditions. For example, a polling format may switch from the processor P to an operator station OS1–OSn if the caller fails to provide digital data in a responsive form. Alternatively, an operator may command a switch to the processor P upon identifying a specific caller from whom data is to be taken.

Figure 2:
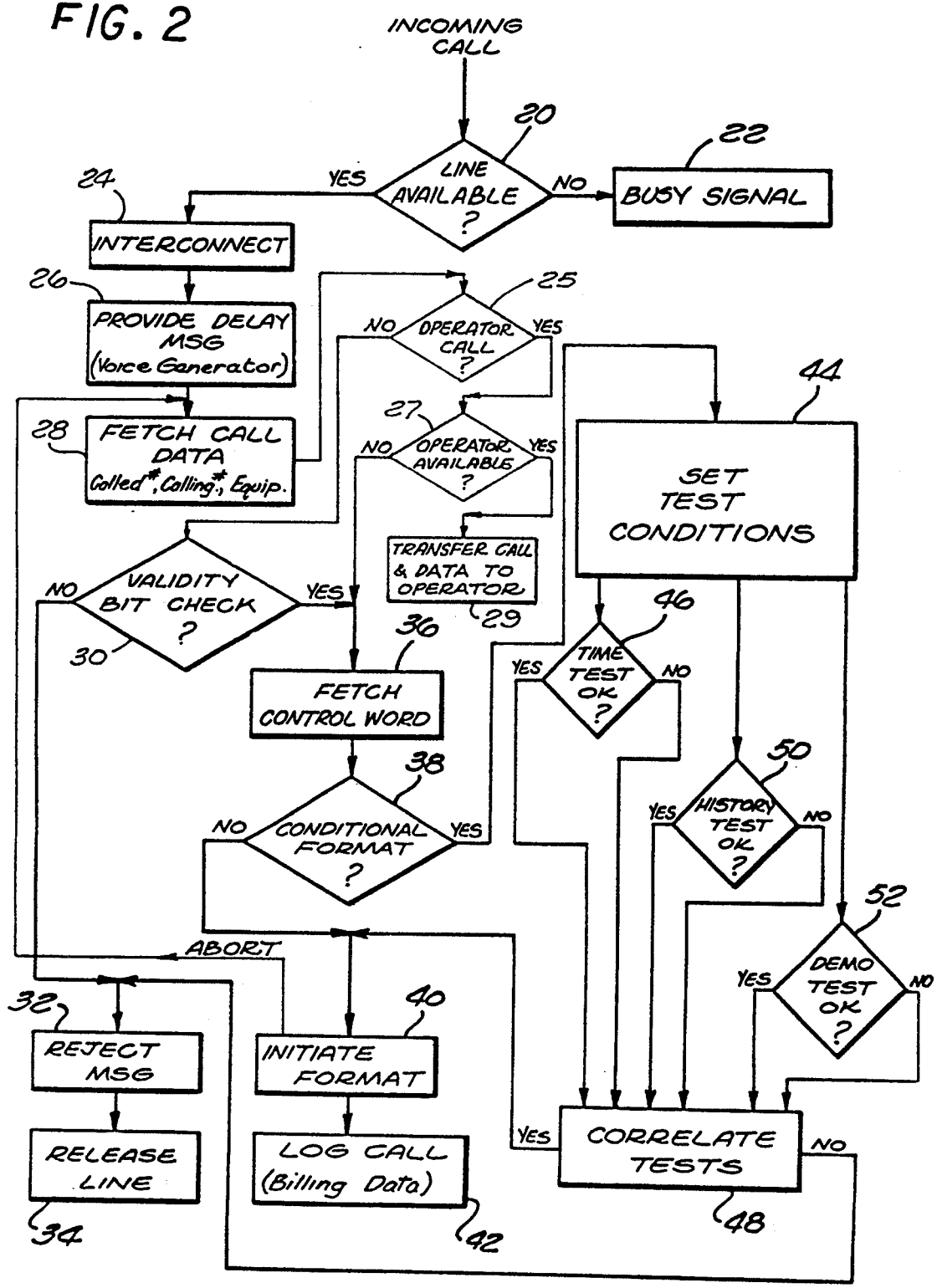
FIG. 2 is a flow diagram illustrating the operating process of the system of FIG. 1.

In the illustrative system of FIG. 1, an operating process is executed as illustrated in FIG. 2. Each incoming call prompts a preliminary query as indicated by a block 20 concerning the availability of a line or port. In the absence of an available line, a busy signal is provided as indicated by the block 22. Alternatively, an available line results in a preliminary interconnect as indicated by a block 24 setting a conditional connection into operation.

As indicated by a block 26, during the screening or testing interval (typically measured in seconds or fractions of seconds) the caller remains on line and may receive a message. That is, the caller might hear silence or may continue to hear the traditional telephonic ringing sound. Alternatively, the caller might be given a brief vocal message to "stand by" as indicated by the block 26. In any event, the caller is held "on line" while the process continues.

With a call on a line, the communication facility CO (FIG. 1) provides signal-represented call data, e.g. the called number, the calling number, and the equipment designation. As indicated by block 28 (FIG. 2) signals representative of the call data are captured to perform preliminary control and processing operations as will now be considered. Note that the selected formats will fall within one of the classes as stated above.

The initial test is illustrated by a query block 25 representing an operation to distinguish calls of class 1 (operator) and class 2 (processor). Calls for a format seeking an operator prompt a "yes" response from the block 25 and proceed to the test of a block 27, "is an operator available?". A "yes" determination advances the process to an operation indicated by a block 29. Specifically, the block 29 represents the operations of coupling a caller to an operator station and transferring the appropriate format data to the station for prompting the operator. If no operator is available (block 27) the process proceeds with automated control to attain an interface in accordance with an appropriate format. Specifically, a control word is fetched (block 36) to establish an operating format for interfacing the call. In that regard, the specified format may be very simple. For example, the call simply may be prompted to indicate identification for a return call. Alternatively, the format may incorporate conditions or other complications as explained below.

Returning to the query block 25, if the call is to be coupled to the processor, an initial test operation is indicated by a block 30. A validity test is performed, for example, a list of calling numbers may be compiled that are to be denied access to any interface with the processor P. Negative calling numbers may result either by the choice of the person responsible for the calling number terminal, or by the choice of the service operating the processor P (FIG. 1). For example, an accumulation of prior improper transactions from a terminal designated by a specific telephone number may provide a basis for complete disqualification. Equipment also may disqualify.

Recognizing that various circumstances may be involved with respect to the total disqualification of a calling terminal, in accordance herewith the test involves formulation of a validity bit as indicated by the query block 30. Acceptable calls set the validity bit at a binary "1".

If the calling terminal is invalid, ("no" from the block 30) the call is rejected as indicated by the block 32 with or without a message and the line is released as indicated by the block 34. Note that the time interval involved is very short and the rejection message may take various forms including a verbal comment, a busy signal or simply a disconnected signal.

If a positive validity bit ("1") is formed at the junction of the query block 30, a control word is fetched under command of the called number as indicated by the block 36. As described in detail below, a control word is available for each operating format of the processor P and is utilized to impose the conditions for an interface and the terms of any associated billing.

As indicated in FIG. 2, the fetched control word of the block 36 prompts an inquiry as to the conditions attendant the selected operating format as indicated by a query block 38. That is, in the process, the query of block 38 determines whether further conditions are imposed for attaining interface with the processor P. If no further conditions are imposed, the format is initiated by pursuing the connected interface as indicated by a block 40. Also, as indicated by a block 42, the call is logged or recorded as with respect to billing data for example.

If access to a format involves conditions ("yes" from the query block 38), tests are specified as illustrated by a block 44. That is, conditions for the interface are specified by the block 44. Of course, the specific tests may involve various criteria; however, in the illustrative embodiment, the conditions involve time, history and demographics. Each exemplary condition will now be considered somewhat preliminarily.

In the disclosed embodiment, time tests involve testing the time of the call against certain limitations. For example, it may be desirable to limit some formats to specific time intervals as in relation to a television broadcast, a real time auction and so on. Note that the time tests also may be related to specific terminal control and geographic areas treated on the basis of telephone area codes. Specific examples will illustrate.

Assume an operating game format that propounds questions to a caller based on knowledge of a particular television program. The program may be broadcast at different times in different geographic areas, and as a consequence it may be desirable to limit calls interfacing the processor format depending on the area code of calling numbers. Accordingly, time tests may involve solely the instant time, or various combinations of time and call data. The specific test is determined as indicated by a block 46 (FIG. 2) imposing detailed operating instructions for the format. The test results are then correlated as represented by a block 48.

As indicated above, in accordance with the described embodiment, another test involves a record as for example directed to the station identified by the calling number. As an example, the record might take the form of either a negative or a positive file (for an individual format). In that regard, all formats involving "pay to dial" (e.g. 976, 900 etc.) calls might be conditioned as a group. Generally, in the case of a negative file, certain numbers are recorded that are to be denied access to a particular operating format. In the case of a positive file, access to the operating format is available only to calling numbers listed in the file.

Considering exemplary implementations of the system, a negative file may be based on limited or restricted use (as in the case of a lottery) or prohibitive use (telephone terminal owner choice). Formats accessible on a "one-time only" basis also may be controlled by negative lists. Thus, an operating format may be inaccessible to a terminal, or may be accessible a specified number of times during a specified interval, e.g. three accesses per week. The historical test is symbolized in FIG. 2 by the query block 50 to conditionally actuate the related tests as indicated in the block 48. History limitations also may involve purely format limits. For example, a give-away or dial-free format may be limited to some predetermined number of calls for a period, e.g. ten thousand calls per day. Thus, limits can be imposed on the economic exposure of a format.

Moving from the historic considerations, demographic tests may be specified as in relation to the geographic area manifest by the area code of the calling number. To consider a specific example, a public opinion poll may be conducted in which a particular geographic balance is defined. In such an operating format, calls may be accepted only until particular quotas are attained with respect to specified area codes. Such tests in the process are indicated by the query block 52, again to instruct the correlation block 48.

With the requisite tests established by selection of a format, the block 48 indicates resolving the acceptability of the call for the selected interface format. If the call is accepted, the process moves to initiate the selected format interface as indicated by the block 40. Conversely, if the call is to be rejected, the process moves to the step indicated by block 32, i.e. reject the call as with a message and release the line.

If a call is accepted, as represented by the block 40, there is a possibility that an established format may be aborted in favor of a different format. For example, interfacing the processor P, a qualified caller may fail to communicate digitally with the result that transfer to a live operator is commanded. Also, in certain situations, a connection to a live operator is to be terminated in favor of an interface to the processor. In either event, an existing format is terminated in favor of a fresh format. That phase of the process is illustrated by an "abort" line from the block 40 returning to the block 28. Thus, the process returns to re-assign the caller to a new format in accordance with fresh data. Thus, transfers according to class 3 operation are implemented along with the other classes of operation by the switch SW (FIG. 1).

Figure 3:
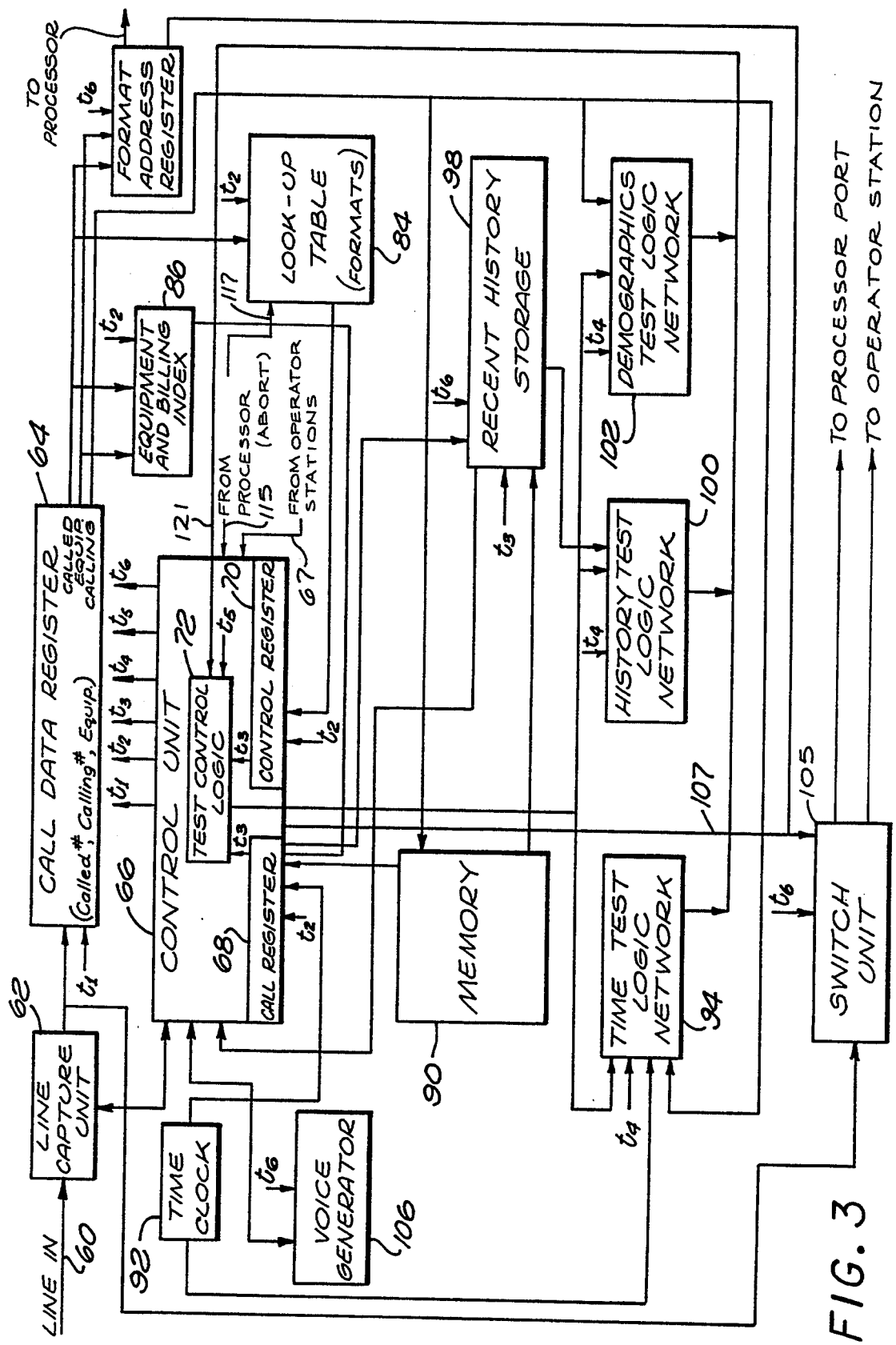
FIG. 3 is a block diagram of a component portion of the system of FIG. 1.

An exemplary detailed structure of the switch SW (FIG. 1) for executing the process of FIG. 2 is represented in FIG. 3. In that regard, individual telephone calls are manifest from the call receiver unit CU (FIG. 1) comprising existing equipment as well known in the prior art. The call data is supplied through a line 60, upper left, FIG. 3. Note that the represented single line 60 is merely symbolic of a channel to carry call data and provide direct telephone communication.

Generally, the system of FIG. 3 illustrates elements of the switch SW of FIG. 1 for processing an individual call. As indicated above, the system of the present invention involves the simultaneous processing of many calls with the possibility that numerous calls are simultaneously being tested for a connection as explained above. Consequently, although the system of FIG. 3 is illustrated with respect to testing a single call, it is to be understood that sequential or parallel operations and multiplexing techniques, as well known and widely practiced in the computer field, are utilized to accomplish multiple processing operations as are described below with reference to FIG. 3.

The line 60 (FIG. 3, upper left) enters a line capture unit 62 through which signal-represented call data is supplied to a call data register 64. Accordingly, the call data is registered to be available for processing operations as explained generally with reference to FIG. 2.

The line capture unit 62 also is connected to a control unit 66. Structurally, the control unit 66 may take the form of various computer facilities incorporating memory and logic capability to sequence and control specific functions as explained below. Generally, the control unit 66 implements specific formats which may involve coupling a caller either to a live operator station OS1–OSn or to the processor P. In that regard, the control unit 66 provides a series of timing signals t1–t6 to sequence the operations of individual component blocks as illustrated. Note that to preserve clarity in FIG. 1, connections of timing signals t1–t6 are not illustrated. Also, the control unit 66 is connected to the operator stations OS1–OSn (line 67) to receive signals indicative of the availability of stations.

Figure 4:
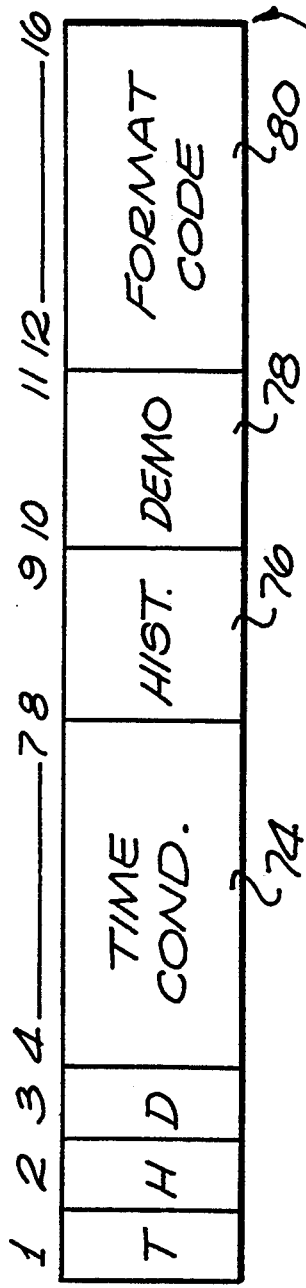
FIG. 4 is a diagrammatic representation of a binary control word as registered and utilized in the system of FIG. 1.

In addition to logic for controlled switching as described, the control unit 66 specifically includes a call register 68, a control register 70 and test control logic 72. The control register 70 receives format control words specified, as by the called number and having a form as illustrated in FIG. 4.

Recapitulating, each of the operating formats has a control word for defining any access conditions or limitations to accomplish a specific format, e.g. connection to an operator station OS1–OSn or to the processor P (FIG. 1). The formats may vary considerably; however, a few examples are the following:

Class 1, connect the live operator if available and provide prompt data for the XYS Company telemarketing program, if operator not available, cue caller: "All operators are busy at the moment, but we will return your call as soon as possible. Please touch your telephone buttons '2' and '4' to identify yourself as twenty-four for the return call".

Class 2, couple qualified callers to computer P for polling interface.

Class 3, couple callers to computer P for the RST Company telemarketing program, however, transfer to live operator (and prompt) if caller is not responsive.

These formats are established by control words that are selected on the basis of call data. The control words are sixteen bits, illustrated as the first sixteen bits (1–16) registered as shown in FIG. 4. An additional group of registered bits (17–20) are provided from call data.

The initial three registered bits in the control register (FIG. 4) serve as test command bits respectively for a time test, a history test and a demographics test. The presence of a "1" bit in any of the first three bit locations specifies the requirement for testing compliance to specified conditions. A "0" bit indicates no test.

The bits "4 through 7" in the control register constitute a field 74 and specify time conditions in relation to the instant time of the call. The field 74 may specify eight distinct time conditions. For example, exemplary specified conditions for a format might be as follows:

Accept calls between 7:00 and 18:00,
Accept calls on Thursday between 9:00 and 10:00,
Accept calls from area code 213 on Wednesday between 15:00 and 16:00,
Accept calls from area code 602 on Wednesday between 16:00 and 17:00.

Essentially, the time condition field 74 (activated by the time bit "1" - first bit position) defines specific intervals during which calls will be accepted for the specific called number and may be further limited by the area codes. A wide range of possibilities are available to accommodate specific programs for individual formats.

A field 76 in the control register embraces bits "8" and "9" and defines the conditions for access to the format based on historical considerations. Thus, two bits are provided to indicate four possible historical limitations. Again, the test is specified by a "1" bit, in this instance in the second bit location of the register 70. The following limitations are exemplary of many possibilities as related to a single telephone number:

Accept one call per day (per caller),
Accept one call per week (per caller),
Accept one call per month (per caller),
Accept one call during any three-day period (per caller),
Accept only 10,000 calls (per format).

Continuing with respect to the contents of the register 70, as illustrated in FIG. 4, bits "10" and "11" constitute a field 78 specifying demographic test limitations. Again, a few examples will illustrate the various possibilities:

Accept calls only from area code 213,
Accept calls from area codes 213, 818 and 619,
Accept only 1,000 calls from area code 213,
Accept calls from area code 213 with the prefix numerals 619.

Again, the demographic test is imposed only upon the existence of a "1" bit, in this instance in the third bit of the control word. As in the other cases, specific possibilities are considerable.

The bits "12" through "16" of the control word constitute a field 80 and designate a selection code for the identified format. These five bits enable a substantial number of formats to be designated and coded with respect to various classifications. For example, calls of the class 1 specifying a desirable connection to a live operator station OS1–OSn might be encoded in a "000" decimal series, e.g. "001" indicates XYZ Company telemarketing program, "034" indicates RST Company program, and so on. Accordingly, a "0" in the most significant digit specifies a live operator format. Similarly, lottery formats might be encoded in a "100" decimal series, e.g. "101, 102, 103 . . . 110, 111, 112". . . and so on; auctions might be designated in a "200" series, e.g.: "201, 202, . . . ". By using decimal equivalent coding formats for various categories, exclusions may be concisely stated. For example, a calling number may be excluded from all lottery operating formats simply by the specification of decimal "100" in association with the calling number.

The data, as illustrated in FIG. 4 is loaded into the control register 70. Again, the first sixteen bits comprise the format control word and are provided from a look-up table 84 (FIG. 3, right, central) upon being addressed by call data from the register 64.

The last bits (bits 17–20) stored in the control register 70 are provided from an equipment and billing instruction index 86. That is, in response to the signal-represented call data indicating the called number and the equipment, the look-up table 84 and the index 86 supply data for loading the control register as indicated above.

Figure 5:
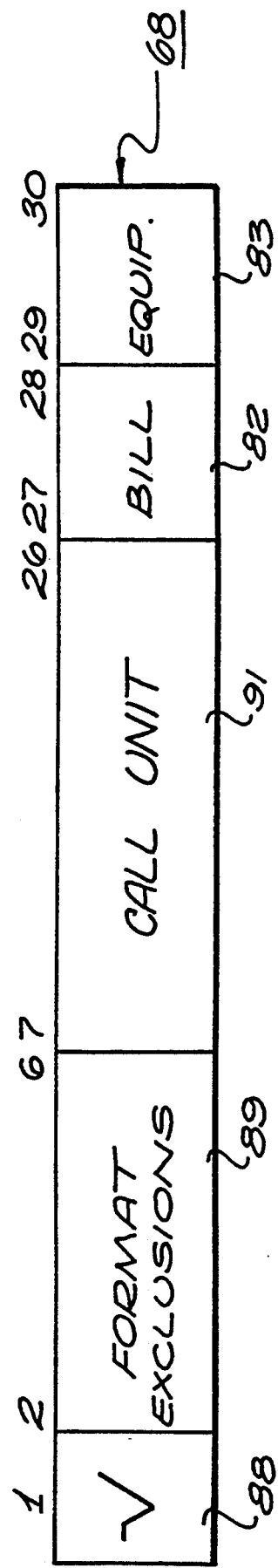
FIG. 5 is a diagrammatic representation of a binary data record word as utilized and recorded in the system of FIG. 1.

While the control register 70 is loaded to specify the operation of the system, the call register 68 in the control unit 66 receives signals for additional control and to formulate a record of the call. Specifically, as represented in FIG. 5, the contents of the call register 68 includes an initial validity bit 88 for indicating that the called number is either on a positive list or is not on a negative list. The determination of the validity bit for location 88 is made by reference to a memory 90 (FIG. 3, central) addressed by the calling number.

While the calling number addresses data to indicate a validity bit, specific format exclusions also may be indicated as explained above with respect to certain formats. For example, certain classifications of formats or specific formats (as a lottery) may be identified as inaccessible for certain telephone terminals as identified by calling numbers. Other than lottery formats, certain discretionary formats also may initiate control to limit access. Accordingly, a field 89 in the call register 68 (FIG. 5, bits "2" through "6") is provided from the memory 90, addressed by the calling number to specify format exclusions. That is, the calling number addresses the memory 90 to load the field 89 and specify limitations. Consider a few examples of format exclusions or limitations for a calling number:

No lottery formats,
One lottery format per week,

Two lottery formats per month of total cost under $25.00,

No auction sales,

Auction sales only with caller entered code I.D. 763.

Again, it will be apparent that many possibilities exist in applying various coding techniques, the above merely being exemplary. Also, as indicated above, a format may be void of any limitations or restrictions. In that event, as explained above, a connection or interface is promptly commanded by the format code.

The bits "7" through "26" stored in the call register 68 (FIG. 5) constitute a field 91 and indicate the time of a call. Signals representative of the instant time of a call to load the field 90 are provided from a time clock 92 (FIG. 3, upper left). Signals from the time clock 92 may be in a Julian code and are provided to the call register 68 and also to a time test logic network 94 (lower left).

The last bits (27-30) in the register 68 are provided from the call data. The bits "27" and "28" indicate format billing data and comprise a field 82. Again, representations are coded; however, with respect to the field 82 information is derived from the called number. For example, an "800" called number may indicate no billing with the representative code being stored in the field 82. As another possibility, a "976" prefix number, or "900" number, may indicate a specific charge in relation to the identified format.

The bits "29" and "30" comprise a field 83 and may actuate a special form of the selected format. In the disclosed embodiment, the field 83 registers call data, as to indicate that the calling terminal is a "pulse" (rotary dial) signal unit or a "tone" (touch) signal unit. In the instance of a rotary terminal, the format program may be modified to accommodate "pulse" signal operation or inject operator communication with a transfer to one of the stations OS1-OSn.

Recapitulating to some extent with regard to the composition of the call record word in the register 68 (FIG. 5), the memory 90 (FIG. 3) is addressed by calling number data to provide data for the validity bit location 88 and the format-exclusion field 89. The time of call is stored in the field 91 from the clock 92. The billing and equipment data are provided by the index 86 in response to "calling" data signals.

Another element of memory, specifically, a recent activity storage 98 (FIG. 3, lower right) is separately illustrated for convenience of explanation. Essentially, the storage 98 receives words from the call register 63 to maintain a record of interface calls. The recent activity storage may periodically be purged to permanent storage if desired. Thus, the recent activity storage 98 accumulates an activity record of all interface participants with respect to specific formats and is utilized in the history test for determining that an instant calling terminal is within the specified historical limitations as provided from the memory 90.

The activity tests are performed by a history test logic network 100 (FIG. 3, lower central). In a related context, the demographics test as explained in detail above is performed by a demographics test logic network 102. The results of the test logic networks are communicated to the test logic 72 in the control unit 66. As a consequence, a switch unit 105 is actuated to either operatively couple the line 60 into a port of the processor P (FIG. 1) or reject the call. If a call is accepted for an interface, a signal is supplied from the test control logic 72 through a line 107 to the switch 105 during the interval of the timing signal T6. The signal in the line 107 also is supplied to a format address register 109 for addressing the processor P. The register 109 stores select data signals to address a specific operating format of the processor P.

Recapitulating to some extent, call data indicates an interface format of the processor P (FIG. 1) with associated limitations, conditions and billing provisions. Call data also indicates possible format limitations or conditions for a calling number. The system processes the data with respect to the conditions and limitations to selectively enable interface operations. Essentially, the call data specifies a format (processor or operator) and any conditions relating to the format. Representative data accordingly is provided from the look-up table 84 and the memory 90 to the control register 70 and the call register 68 respectfully. Preliminary conditions may or may not be involved; however, qualified calls for an operator involve tests of availability within the control unit 66 according to data received from the stations OS1-OSn (line 67). As a result, calls are either interfaced to an operator who receives a format prompt, or interfaced to the processor according to a specified format. Thereafter, a shift may command a redetermination and a transfer as described in detail below.

In view of the above structural and logic description of the system of FIG. 3, the process as described with respect to FIG. 2 and the stored control word forms as described with respect to FIGS. 4 and 5, a comprehensive understanding of the described embodiment may now best be accomplished by assuming an exemplary call and treating the individual responsive steps. Accordingly, assume the occurrence of a call as manifest on the line 60 (FIG. 3, upper left). Further, assume that the called number, "976 513 7777" designates a lottery format with limited access. Details of the limited access will be treated below.

Upon occurrence of the call, the line capture unit 62 seizes a line relationship and signals the control unit 66. Immediately, an interval of time signal t1 is initiated and the register 64 is loaded with the called number ("900 513 7777"), the calling number ("415 318 4444") and the equipment designation (tone or no tone). To the caller, the operations as now described involve an almost imperceptible delay.

During the following interval of timing signal t2, the call register 68 and the control register 70 are loaded as illustrated respectively in FIGS. 4 and 5. Specifically, the called number and equipment designation specify data to load the control register 70. The calling number ("415 318 4444") from the register 64, prompts the memory 90 to load the validity bit 88 and the format exclusions in the field 89 of the register 68. Concurrently, the time clock 92 loads the field 91 with signals representative of the current time.

If the call register 68 does not receive a validity "1" bit, the calling number is indicated to be barred with a consequence that the line is released by the control unit 66. In that regard, a voice generator 106 (FIG. 3, left central) may be actuated by the control unit 66 branching to the operation of timing signal t6. Accordingly, a message of denial may be provided on the line 60 prior to release of the line. Note that the voice generator 106 may be variously used to prompt or inform callers in certain preliminary selection operations supplemental to the specific operations disclosed below.

As indicated above, concurrently with the loading of the call register 68 (timing signal t2), the control register 70 also is loaded. Specifically, from the register 64, the called number cues the look-up table 84 to fill most of the control register (bits "1" through "16" FIG. 4) The fields 82 and 83 are supplied from the index 86.

That is, distinct from the fields loaded into the control register 70 from the look-up table 84, the fields 82 and 83 are supplied from the index 86. In that regard, assume the called number (area code 976) indicates that the charge for the service of the call will be billed through the caller's telephone records. Assume that the field 83 indicates a "tone" terminal effective for a conventional digital interface.

At this point, some still further assumptions will be made to pursue the explanation of the detailed operations. Specifically, assume that the format specified by the called number ("900 513 7777") is a lottery format and includes limitations with respect to time, history and demographics. Accordingly, the initial three bits of the control word all will be "1" bits in the control register 70.

Assume further that the time conditions specified by the field 74 (FIG. 4) limit calls from area code 415 to days other than Sunday. Assume that the history field 76 of the control word imposes a limitation of one call per day per calling station. Assume that the demographics field 78 excludes any call from area codes "512", "412", "812", ... (not "415"). Finally, assume the selected format (field 80) designates a specific lottery format, that is lottery "128".

In addition to registration of the data sets detailed above, because a history test is specified, the recent history storage 98 is cued during the interval of timing signal t3. The operation is through the memory 90 by the control unit 66 to prompt the supply of historical data (previously registered record words) for the telephone terminal designated by the calling number ("415 318 4444"). Specifically, during the interval of timing signal t3, the storage 98 supplies data on the calling number to the history test logic network 100. Such data is compiled into a test format as to indicate the number of calls per day, per week, and so on. Note that aggregate call totals may also be supplied as a test criteria. Thus, the control unit 66 coordinates the test criteria data preparatory to the test operations of the individual logic networks 94, 100 and 102.

To summarize, in accordance with the above assumptions, the test control logic 72 is set up to coordinate the following specific logic tests:

Time limitation test by network 94: accept calls from area code 415 except on Sunday, History limit test by network 100: accept only one call per day per station, Demographics test by network 102: accept no calls from area codes 512, 412, 812 ... (415 not listed).

As explained above, in addition to the limitations specified, in relation to the format, further limitations may be specified by the calling number. Such limitations are specified by the field 89 in the register 68 (FIGS. 3 and 5). In the instant example, assume that according to the record word, participation in the lottery format is limited to the interval between 10:00 a.m. and 3:00 p.m., e.g. when minors are in school. The code for such a format is supplied during the interval of timing signal t3 from the field 89 of the call register 68 to further establish the set-up of the logic 94 acting through the test control logic 72.

Recapitulating with regard to the test control logic 72, essentially a program is defined imposing each of the limitations that are specified by the call data in sufficient detail that comparison tests are expediently performed by the networks 94, 100 and 102. It is stressed, as indicated above, that the tests are selectively performed only in the event a "1" bit appears in the representative first three bit locations of the control word format. In the illustrative example, all the tests were commanded and accordingly the test control logic 72 sets up the condition for tests to be performed by the networks 94, 100 and 102, all during the interval of timing signal t3. Of course, the specific example represents one possibility of a substantial number of programs that might be specified to the system.

Figure 6:
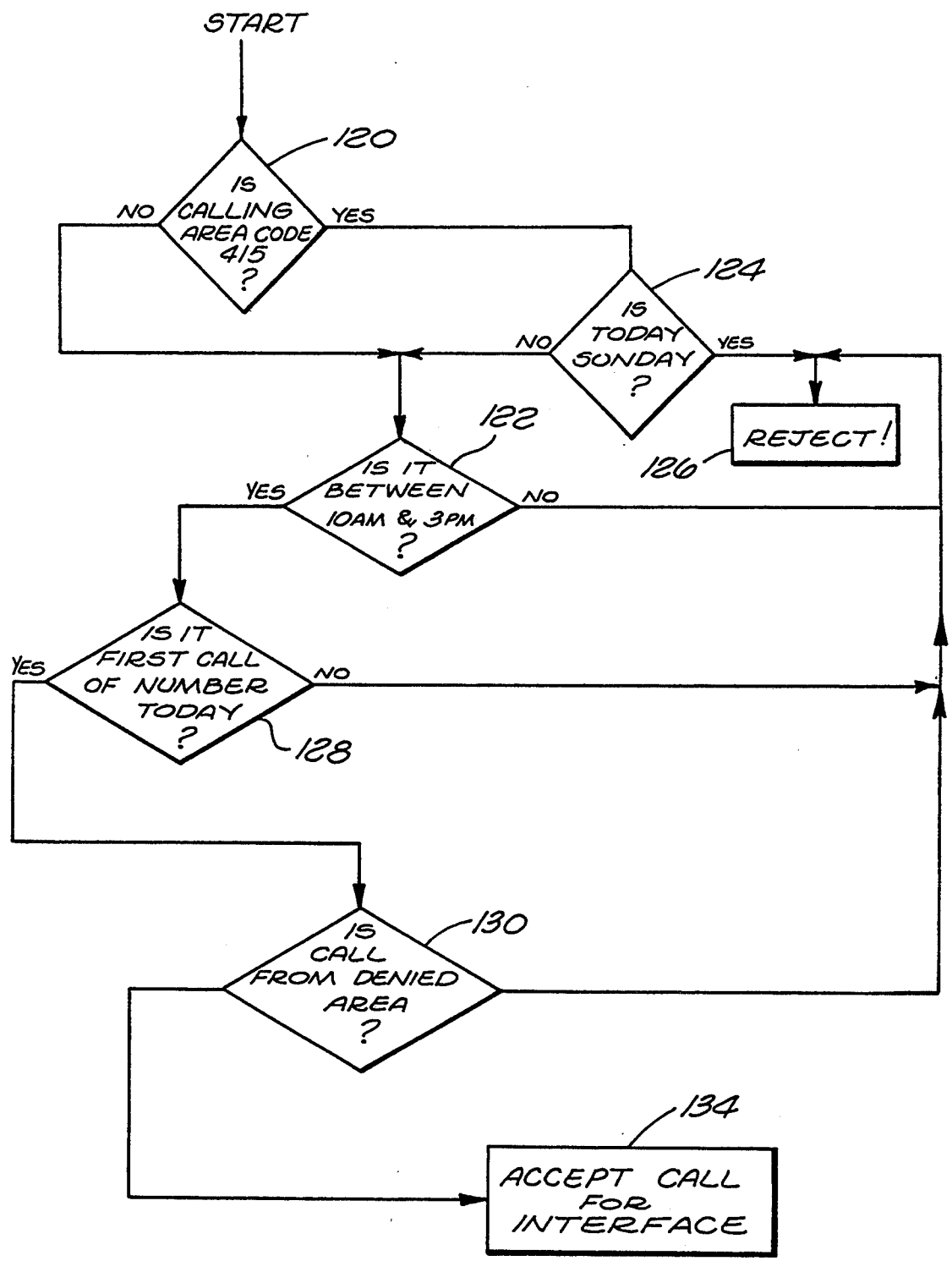
FIG. 6 is a flow diagram illustrating the operating process of the structure represented in FIG. 5.

With the test formats established in the test control logic 72, the logic networks 94, 100 and 102 are driven during the interval of test signal t4 to execute a program in accordance with the assumed example. The process may be variously implemented in logic using well known techniques and is detailed in FIG. 6. Consider the time test of the network 94. The time test logic network 94 approves an interface only if: the call is not from area code "415" on a Sunday and furthermore the call occurs between the hours of 10:00 a.m. and 3:00 p.m. As indicated in FIG. 6, a decision block 120 resolves the area-code "415" time test. If the area code is not "415", the logic proceeds to the next query block 122. Alternatively, if the area code is "415" the day must be tested against Sunday as indicated by the query block 124. An affirmative indication from the Sunday test of block 124 prompts a rejection as indicated by the block 126.

If the Sunday test of block 124 is passed, the program imposes another time test, that is the time-of-day test as indicated by the block 122. Again, a negative result prompts a rejection; however, a positive result involves the next step as indicated by the block 128.

Note that the operations designated by query blocks 120, 122 and 124 are performed by the time test logic network 94 (FIG. 3). The next test of the block 128 is performed by the history test logic 100. The block 128 (FIG. 6) involves a determination of whether or not the instant call is the first for the calling terminal on the instant calendar day. If not, the limitations are exceeded and the call is rejected. If the test is passed, the process next involves the demographic test logic network 102 (FIG. 3) to determine whether or not the call originated from an excluded area based on the calling number area code.

Area controls are illustrated by the query block 130 of FIG. 6. Specifically, the demographics test logic network 102 determines whether or not the current call is from a denied area. If so, the call is rejected as indicated by the block 126. Alternatively, if the area is not excluded, as illustrated by the block 134 in FIG. 6, the interface is accepted. In the instant case, the area "415" is acceptable.

In the operation of the system as illustrated in FIG. 3, the logic networks 94, 100 and 102 indicate test results to the test control logic 72 during the interval of the timing signal t5. The logic 72 correlates the test result for action by the control unit 66. If the imposed conditions are met (or if there are no conditions) the control unit 66 actuates the switch unit 105 and the address register 109 through the line 107 to perfect the interface from the line 60 (upper left) to either a port in the processor P (FIG. 1) or one of the operator stations OS-1–OSn. Essentially, the switching operation occurs during the interval of the timing signal t6. Concurrently, the address register 109 specifies the select operating format as stored in the processor P for direct use in an interface with a caller, or to be retrieved and supplied through the switch SW to prompt an operator at a station OS1–OSn.

Also during the interval of the timing signal t6, the contents of the call register 68 is stored in the recent history storage 98. Note that billing data is stored with the call words and may be selectively extracted from the storage 98. At the termination of the timing signal t6, the interface endures until there is a "disconnect" or an "abort".

If the processor P senses the existence of conditions specifying a shift between a processor interface and a live operator communication, the control unit 66 is actuated as indicated through line 115. Note that the abort signal is formed either in response to predetermined conditions in an interface with the processor P, or on command from an active operator station. The signal is also supplied to the look-up table 84 which becomes active if a transfer is conditional. That is, if a transfer is conditional, the tests as described above may be invoked. Conversely, if the transfer is unconditional, the control unit 66 simply actuates the switch 105 to make the change and prompts the format address register to establish the desired format or prompt pattern for an operator.

The formats may involve various records, however, in accordance with the system of the present invention affords considerable flexibility to program individual conditions and limitations for each interface format based on the call data (calling number and called number). An interface may involve no conditions or conditions may be imposed from the called number (format selection), the calling number, or both. Accordingly, effective control may be imposed depending upon the service requested as manifest by an individual format, the instant time, the history of use and the demographics involved. The imposed limitations may be non-existent or may involve a relatively complex test pattern as explained in detail above.

In the disclosed embodiment, an effective record of calls is accumulated in the recent history storage 98. Thus, a composite and detailed record is accumulated of individual calls as executed.

It is to be appreciated that numerous formats may be implemented and controlled utilizing the principles of the system as illustrated above. Accordingly, it is to be understood that the system of the present invention should be interpreted in accordance with the claims as set forth below.

What is claimed is:

1. An interface control system for use with, (1) a communication facility including remote terminals for individual callers, wherein said remote terminals may comprise a conventional telephone instrument including voice communication means and digital input means for providing data, (2) a multiple port, multiple format processor for interfacing a substantial number of callers in any of a plurality of formats to concurrently process data, and (3) a plurality of live operator stations with prompting capability for a plurality of formats, said interface control system comprising:

call data means for receiving signal-represented call data from said terminals including DNIS automatically provided by said telephonic communication system;

selection means coupled to said call data means for selecting one of said formats under control of said call data including DNIS to thereby further specify imposed conditions that must exist for a connection of a call either to said multiple port, multiple format processor or one of said live operator stations in accordance with said select one of said formats, at least one of said formats having at least one imposed condition; and interconnect switch means for providing format data and controlling connections from a calling remote terminal to a port of said multiple port, multiple format processor or one of said live operator stations under control of said selection means.

2. A system according to claim 1 further including test means to specify test conditions for certain of said formats and means to test compliance with said conditions to further control said interconnect switch means.

3. A system according to claim 2 wherein one of said test means comprises means for executing a test based on the time of a call.

4. A system according to claim 2 wherein one of said test means comprises means for executing a test based on the history of the calling remote terminal.

5. A system according to claim 2 wherein one of said test means comprises means for executing a test based on the demographics of the calling remote terminal.

6. A system according to claim 1 wherein said selection means includes a look-up table for specifying said formats addressed by call data.

7. A system according to claim 1 wherein said selection means includes a control storage location and means for setting control data in said control storage location responsive to said call data.

8. A system according to claim 1 further including a voice generator means for prompting a caller.

9. A system according to claim 1 further including means for storing data representative of calls.

10. A system according to claim 9 wherein said means for storing includes means for storing billing data.

11. A system according to claim 1 further including means to provide an abort signal, the system being responsive to said abort signal to reactuate said interconnect switch means for providing alternative connections with format data.

12. A system according to claim 11 further including test means to specify test conditions for certain of said formats and means to test compliance with said conditions to further control said interconnect switch means.

13. A system according to claim 1 wherein said selection means selects under control of DNIS signals.

14. A system according to claim 1 wherein said selection means selects under control of ANI signals.

15. A system according to claim 1 wherein said selection means selects under control of equipment type signals.

16. An interface control system for use with, (1) a communication facility including remote terminals for individual callers, wherein said remote terminals may comprise a conventional telephone instrument including voice communication means and digital input means for providing data, (2) a multiple port, multiple format processor for interfacing a substantial number of callers in any of a plurality of formats to concurrently process data, and (3) a plurality of live operator stations with prompting capability for a plurality of formats, said interface control system comprising:

call data logic for receiving signal-represented call data from said terminals including DNIS automatically provided by said telephonic communication system;

selection logic coupled to said call data logic for selecting one of said formats under control of said call data including DNIS to thereby further specify imposed conditions that must exist for a connection of a call either to said multiple port, multiple format processor or one of said live operator stations in accordance with a select one of said formats at least one of said formats having at least one imposed condition;

test logic coupled to said selection logic for testing the imposed conditions to provide approval signals; and interconnect switch means for providing connections from a calling remote terminal to a port of said multiple port, multiple format processor or one of said live operator stations under control of said selection logic and under control of said approval signals from said test logic.

17. A process for interfacing (1) a telephonic communication system including remote terminals either with (2) a multiple port, multiple format data processing system, said multiple port, multiple format data processing system for concurrently processing data from said remote terminals according to a plurality of formats, at least one of said formats having at least one condition for a calling terminal, or (3) one of a plurality of operator stations with prompting capability for a plurality of formats, and wherein said telephonic communication system provides call data signals, as to indicate called and calling numbers, said process including the steps of:

receiving said call data signals from said telephonic communication system for a calling remote terminal indicative of DNIS and ANI automatically provided by said telephonic communication system;

selecting a processing format either for said multiple port, multiple format processing system or one of said plurality of operator stations for the calling remote terminal under control of said data signals as the selected format;

testing the selected format in relation to said call data signals; and conditionally interfacing said calling terminal to said multiple port, multiple format data processing system for execution of said selected format or to one of said plurality of operator stations under control of said testing of call data signals.

18. A process for interfacing (1) a telephonic communication system including remote terminals either with (2) a multiple port, multiple format data processing system, said multiple port, multiple format data processing system for concurrently processing data from said remote terminals according to a plurality of formats, at least one of said formats having at least one condition for a calling terminal, or (3) one of a plurality of operator stations with prompting capability for a plurality of formats, and wherein said telephonic communication system provides call data signals, as to indicate called and calling numbers, said process including the steps of:

receiving said call data signals from said telephonic communication system for a calling remote terminal indicative of DNIS and ANI automatically provided by said telephonic communication system, wherein said plurality of formats consist of at least one pay to dial format and one 800 toll free format;

selecting a processing format either for said multiple port, multiple format processing system or one of said plurality of operator stations for said calling remote terminal under control of said call data signals as the selected format;

testing the selected format in relation to said call data signals; and conditionally interfacing said selected format to said calling remote terminal under control of said testing of said call data signals.

19. A method for interfacing (1) a telephonic communication system including individual remote calling terminals for individual callers with (2) a multiple port, multiple format data processing system, said multiple port, multiple format data processing system for concurrently processing data from said remote terminals according to a plurality of formats, at least one of said formats having at least one imposed condition for said remote terminals calling to interface said data processing system, and (3) a plurality of live operator attended terminals, and wherein said telephonic communication system includes the capability of providing call data signals, said method comprising the steps of:

receiving said call data signals from said telephonic communication system for said remote terminals calling to interface said data processing system including DNIS automatically provided by said telephonic communication system;

selecting for said remote terminals, a select processing format from said plurality of formats of said multiple port, multiple format data processing system under control of said call data signals including DNIS provided by said telephonic communication system;

testing said select processing format in relation to said call data signals;

conditionally interfacing said select processing format to said remote terminals under control of said testing in relation to said call data signals; and selectively terminating certain select calls from said remote terminals in favor of said operator attended terminals.

20. A method for interfacing (1) a telephonic communication system including individual remote calling terminals for individual callers with (2) a multiple port, multiple format data processing system, said multiple port, multiple format data processing system for concurrently processing data from said remote terminals according to a plurality of formats, at least one of said formats having at least one specified condition for said remote terminals calling to interface said data processing system, and (3) a plurality of live operator attended terminals, and wherein said telephonic communication system includes the capability of providing call data signals, said method comprising the steps of:

receiving said call data signals from said telephonic communications system for said remote terminals calling to interface said data processing system including DNIS automatically provided by said telephonic communication system;

selecting for said remote terminals, a select processing format from said plurality of formats of said multiple port, multiple format data processing system under control of said call data signals including DNIS provided by said telephonic communication system;

testing said select processing format in relation to said call data signals;

conditionally interfacing said selected processing format to said remote terminals;

selectively terminating certain select calls from said remote terminals in favor of said operator attended terminals; and transferring substantially all of said certain select calls from said operator attended terminals back to said multiple port, multiple format data processing system.

21. A method for interfacing a telephonic communication system according to claim 19, wherein said conditionally interfacing step further comprises the step of:

interfacing said selected processing format to said remote terminals based upon data entered by operators at said live operator attended terminals.

22. A method for interfacing a telephonic communication system according to claim 19, further comprising the step of:

providing signal-represented call data from said remote terminals including calling numbers as additional call data signals.

23. A method for interfacing a telephonic communication system according to claim 22, further comprising the step of:

providing said additional call data signals automatically from said telephone communication system (e.g. ANI).

24. A method for interfacing a telephonic communication system according to claim 22, further comprising the steps of:

storing a record of negative file data, said select processing format using said additional call data signals to access said record and obtain data to specify and test for negative file conditions; and terminating calls from said remote terminals if said calling number matches said data obtained from said negative file data.

25. A method for interfacing a telephonic communication system according to claim 22, further comprising the step of:

storing a record of positive file data, said select processing format accessing said record based on said additional call data and obtaining data to specify and test for positive file conditions.

26. A method for interfacing a telephonic communication system according to claim 25, further comprising the step of:

terminating calls from said remote terminals if said data to specify and test for positive file conditions is not located.

27. A method for interfacing a telephonic communication system according to claim 25, further comprising the step of:

recording terms of caller billing associated with said select processing format.

28. A method for interfacing a telephonic communication system according to claim 19, wherein a plurality of called numbers are associated with said select processing format.

29. A method for interfacing a telephonic communication system according to claim 19, further comprising the step of:

testing to limit access to said select processing format on a one-time only basis.

30. A method for interfacing (1) a telephonic communication system including remote terminals for individual callers to make individual calls with (2) a multiple port, multiple format data processing system, said multiple port, multiple format data processing system for concurrently processing data from said remote terminals according to a plurality of formats, at least one of said formats having at least one condition for said remote terminals calling to interface said data processing system, and (3) a plurality of live operator attended terminals, and wherein said telephonic communication system provides call data signals, said method comprising the steps of:

receiving said call data signals from said telephonic communications system for said remote terminals indicative of DNIS automatically provided by said telephonic communication system;

selecting a select processing format from said plurality of formats of said multiple port, multiple format processing system under control of said call data signals;

testing said select processing format in relation to said call data signals to provide approval signals;

conditionally interfacing said select processing format to said remote terminals under control of said approval signals and said call data signals; and storing data relating to said individual calls, along with any pay to dial billing data responsive to said call data signals.

31. A method for interfacing a telephonic communication system according to claim 30, further comprising the step of:

providing signal-represented call data from said remote terminals including calling numbers as additional call data signals.

32. A method for interfacing a telephonic communication system according to claim 31, further comprising the step of:

providing said additional call data signals automatically from said telephonic communication system (e.g. ANI).

33. A method for interfacing a telephonic communication system according to claim 32, further comprising the step of:

selectively extracting said pay to dial billing data.

34. A method for interfacing a telephonic communication system including remote terminals for individual callers to make individual calls with a multiple port, multiple format data processing system and a plurality of live operator attended terminals, said multiple port, multiple format data processing system for concurrently processing data from said remote terminals according to a plurality of formats, at least one of said formats having at least one condition for said remote terminals calling to interface said data processing system, and wherein said telephonic communication system provides certain call data signals, said method comprising the steps of:

receiving said certain call data signals from said telephonic communications system for said remote terminals calling to interface said data processing system including DNIS automatically provided by said telephonic communication system;

selecting for said remote terminals, a specific pay to dial processing format from said plurality of formats of said multiple port, multiple format processing system under control of said call data signals including DNIS;

testing said specific pay to dial processing format in relation to additional call data signals indicative of caller telephone number to provide approval signals; and conditionally interfacing said specific pay to dial processing format to said remote terminals under control of said approval signals.

35. A method for interfacing a telephonic communication system according to claim 34, wherein said certain call data signals automatically provided by said telephonic communication facility include equipment data.

36. A method for interfacing a telephonic communication system according to claim 35, further comprising the step of:
automatically providing calling numbers (e.g. ANI) from said telephonic communication system as additional call data signals.

37. A method for interfacing a telephonic communication system according to claim 36, further comprising the step of:
testing said calling numbers (e.g. ANI) to specify use history conditions relating to said specific pay to dial processing format, for each of said individual calling terminals.

38. A method for interfacing a telephonic communication system according to claim 34, further comprising the step of:
testing to limit access of said remote terminals to a one time only use.

39. A method for interfacing a telephonic communication system according to claim 36, further comprising the steps of:
storing a record of negative file data, said specific pay to dial processing format accessing said record utilizing said automatically provided calling number data and obtaining data to specify and test for negative file conditions; and
terminating calls from said remote terminals if said calling number matches said data obtained from said negative file data.

40. A method for interfacing a telephonic communication system according to claim 39, wherein said test for negative file conditions is controlled by said calling numbers (e.g. ANI) automatically provided from said telephonic communication system as additional call data signals.

41. A method for interfacing a telephonic communication system according to claim 34, further comprising the steps of:
storing a record of positive file data, said specific pay to dial processing format accessing said record utilizing said caller telephone number data and obtaining data to specify and test for positive file conditions.

42. A method for interfacing a telephonic communication system according to claim 41, wherein said test for positive file conditions is controlled by calling numbers (e.g. ANI) automatically provided from said telephonic communication system as additional call data signals.

43. A method for interfacing a telephonic communication according to claim 34, further comprising the step of:
processing certain select of said remote terminals calling to interface said multiple port, multiple format data processing system based on said call data signals to connect said remote terminals to one of said plurality of live operator attended terminals.

44. A method for interfacing a telephonic communication according to claim 43, further comprising the step of:
automatically connecting certain of said remote terminals to certain of said plurality of live operator attended terminals where said individual callers are appropriately prompted.

45. A method for interfacing a telephonic communication according to claim 34, wherein said testing step further comprises the step of:
executing a test based on historical limitations applied to an individual format and utilizing DNIS to control said test.

46. A method for interfacing a telephonic communication system including remote terminals with a multiple port, multiple format data processing system, said multiple port, multiple format data processing system for concurrently processing data from said remote terminals according to a plurality of formats, at least one of said formats having at least one imposed condition for said remote terminals calling to interface said data processing system, and wherein said telephonic communication system automatically provides call data signals, said method comprising the steps of:
receiving said call data signals from said telephonic communications system for said remote terminals including call data signals indicative of DNIS automatically provided by said telephonic communication system;
selecting for said remote terminals, a select processing format from said plurality of formats of said multiple port, multiple format processing system under control of said call data signals;
testing the select processing format in relation to said call data signals to limit access by said remote terminals to a one time use; and
conditionally interfacing said select processing format to said remote terminals responsive to said testing step.

47. A method for interfacing a telephonic communication system according to claim 46, further comprising the step of:
automatically providing calling numbers from said telephone communication system (e.g. ANI) as additional call data signals.

48. A method for interfacing a telephonic communication system including remote terminals with a multiple port, multiple format data processing system, said multiple port, multiple format data processing system for concurrently processing data from said remote terminals according to a plurality of formats, at least one of said formats having at least one imposed condition for said remote terminals calling to interface said data processing system, and wherein said telephonic communication system provides call data signals, said method comprising the steps of:
receiving said call data signals from said telephonic communications system for said remote terminals including DNIS and ANI automatically provided by said telephonic communication system;
selecting a pay to dial processing format from said plurality of formats of said multiple port, multiple format processing system under control of said call data signals including DNIS;
testing said pay to dial processing format in relation to said call data signals to provide test result signals;
conditionally interfacing said pay to dial processing format to said remote terminals responsive to said test result signals; and storing billing provision data for each individual calling terminal based on said call data signals.

49. An interface control system for use with, (1) a communication facility including remote terminals for individual callers, wherein said remote terminals may comprise a conventional telephone instrument including voice communication means and digital input means for providing data, and (2) a multiple port, multiple format processor for concurrently processing data from a substantial number of callers in any of a plurality of formats, and (3) a plurality of live operator attended terminals with prompting capability for a plurality of formats, said interface control system comprising:

call data means for receiving signal-represented call data from said remote terminals including DNIS automatically provided by said telephonic communication system;

selection means coupled to said call data means for selecting one format from said plurality of formats of said multiple port, multiple format processor, said selection means being controlled by said signal-represented call data including DNIS to specify imposed conditions that must exist for a connection to said multiple port, multiple format processor, at least one of said formats having at least one imposed condition;

test means coupled to said selection means for testing said specified imposed conditions for said remote terminals to provide approval signals;

interconnect switch means coupled to said test means for providing connections from said multiple port, multiple format processor to said remote terminals under control of said approval signals; and switch means coupled to said interconnect switch for switching to one of said live operator attended terminals based on call data representative of a remote terminal device.

50. A system according to claim 49, further comprising:

switch means for switching calls from said live operator attended terminal back to said multiple format processor for automated processing.

51. An interface control system for use with, (1) a telephonic communication facility including remote terminals for individual callers, wherein said remote terminals may comprise a conventional telephone instrument including voice communication means and digital input means for providing data, and (2) a multiple port, multiple format processor for concurrently processing data from a substantial number of callers in any of a plurality of formats, said interface control system comprising:

call data means for receiving signal-represented call data from said remote terminals indicative of DNIS automatically provided by said telephonic communication facility;

selection means coupled to said call data means for selecting one pay to dial format from said plurality of formats of said multiple port, multiple format processor, said selection means being controlled by said signal-represented call data to specify imposed conditions that must exist for a connection to said multiple port, multiple format processor, at least one of said formats having at least one imposed condition;

test means coupled to said selection means for testing said imposed conditions to provide approval signals;

interconnect switch means coupled to said test means for providing connections from said multiple port, multiple format processor to said remote terminals under control of said approval signals; and record means for storing data representative of calls from said individual callers and pay to dial individual caller billing data, under the control of said signal-represented call data.

52. A method for interfacing a telephonic communication system according to claim 51, further comprising the step of:

automatically providing calling numbers from said telephone communication system (e.g. ANI) as additional call data signals.

53. An interface control system according to claim 51, wherein said individual caller billing data is based on a control word for each operating format which imposes the terms of said caller billing data.

54. An interface control system for use with, (1) a telephonic communication facility including remote terminals for individual callers, wherein said remote terminals may comprise a conventional telephone instrument including voice communication means and digital input means for providing data, and (2) a multiple port, multiple format processor for concurrently processing data from a substantial number of callers in any of a plurality of formats, said telephonic communication facility automatically provides call data signals, as to indicate called numbers to select a particular format from said plurality of formats, and (3) a plurality of live operator attended terminals with prompting capability for a plurality of formats, said interface control system comprising:

interface means for providing an introductory automated voice message relating to a specific format from said plurality of formats;

means for forwarding coupled to said interface means for forwarding a call from any one of said remote terminals to one of said plurality of live operator attended terminals;

means for processing coupled to said forwarding means for processing caller information data entered by an operator at said live operator attended terminal;

means for storing coupled to said processing means for storing certain select data from said caller information data entered by said operator; and means for reconnecting said call to said interface means to receive certain processed data via an automated voice message.

55. An interface control system according to claim 54, wherein said call data signals automatically provided by said telephonic communication facility include data representative of said remote terminals.

56. An interface control system according to claim 55, wherein said automatically provided call data signals indicating called numbers and data representative of said remote terminals forward said call automatically to one of said plurality of live operator attended terminals.

57. An interface control system according to claim 54, wherein certain of said individual callers digitally enter data.

58. An interface control system according to claim 57, wherein said data entered by said individual callers is stored in said interface control system.

59. An interface control system according to claim 54, further comprising:

test structure to specify test conditions against which said caller information data entered by said operators is tested to provide approval signals and said call is interfaced with said specific format depending upon said approval signals.

60. An interface control system according to claim 59, wherein said test structure executes a test based on the history of said remote terminal.

61. An interface control system according to claim 54, wherein a plurality of called numbers are associated with said select processing format.

62. A method for interfacing a telephonic communication system including individual remote calling terminals for individual callers to make individual calls with a multiple port, multiple format data processing system and a plurality of live operator attended terminals, said multiple port, multiple format data processing system for concurrently processing data from said remote terminals according to a plurality of formats, at least one of said formats having at least one condition for said remote terminals calling to interface said data processing system, and wherein said telephonic communication system automatically provides call data signals, said method comprising the steps of:

receiving said call data signals from said telephonic communications system for said remote terminals calling to interface said data processing system indicative of DNIS automatically provided by said telephonic communication system;

selecting for said remote calling terminals, a select processing format from said plurality of formats of said multiple port, multiple format processing system under control of said call data signals, said plurality of formats including pay to dial processing formats;

testing use history conditions for said remote calling terminals when said select processing format is a pay to dial processing format to provide approval signals; and conditionally interfacing said pay to dial processing format to said remote terminals under control of said approval signals.

63. A method for interfacing a telephonic communication system according to claim 62, wherein said automatically provided call data signals further indicate information indicative of said remote terminal devices.

64. A method for interfacing a telephonic communication system according to claim 62, wherein said testing step comprises the step of testing use history conditions for said remote calling terminals only for certain of said pay to dial processing formats.

65. An interface control system for use with, (1) a communication facility including remote terminals for individual callers to make calls, wherein said remote terminals may comprise a conventional telephone instrument including voice communication means and some of said remote terminals may further comprise digital input means for providing data, and (2) a multiple port, multiple format processor for concurrently processing data from a substantial number of callers in any of a plurality of formats, said communication facility automatically provides call data signals with respect to pay to dial formats, as to indicate called data (DNIS) including equipment data, to select a particular format from said plurality of formats, and (3) a plurality of live operator attended terminals with prompting capability, for a plurality of formats, said interface control system comprising:

interface means for providing automated voice messages relating to a specific format to certain of said individual callers, wherein said certain of said individual callers digitally enter data through said digital input means;

means for directly forwarding a call coupled to said interface means for forwarding a call from any one of said remote terminals to one of said plurality of live operator attended terminals under control of said call data signals when said remote terminals do not have capability to digitally provide data;

means for processing coupled to said live operator attended terminals for processing caller information data entered by an operator at said live operator attended terminal; and means for storing coupled to said interface means and said processing means for storing certain select data from said caller information data entered by said operator and data entered digitally by said individual callers.

66. An interface control system according to claim 65, wherein one of said pay to dial formats comprises a 900 number calling format.

67. A method for interfacing a telephonic communication system including remote terminals with a multiple port, multiple format data processing system, said multiple port, multiple format data processing system for concurrently processing data from said remote terminals according to a plurality of formats, at least one of said formats having at least one condition for said remote terminals calling to interface said data processing system, and wherein said telephonic communication system provides call data signals indicating called (e.g. DNIS) and calling (e.g. ANI) numbers, said method comprising the steps of:

receiving said call data signals from said telephonic communications system for said remote terminals indicative of DNIS and ANI automatically provided by said telephonic communication system;

selecting a pay to dial processing format from said plurality of formats of said multiple port, multiple format processing system under control of certain of said call data signals;

testing said pay to dial processing format in relation to said call data signals to provide test result signals;

conditionally interfacing said pay to dial processing format to said remote terminals responsive to said test result signals; and storing billing provision data for each individual calling terminal based on said call data signals.

* * * * *

UNITED STATES PATENT AND TRADEMARK OFFICE
CERTIFICATE OF CORRECTION

PATENT NO. : 5,351,285
DATED : September 27, 1994
INVENTOR(S) : Ronald A. Katz

It is certified that error appears in the above-indentified patent and that said Letters Patent is hereby corrected as shown below:

Column 1, line 8, change "Telephone" to --Telephonic--;

Column 9, line 10, change "XYS" to --XYZ--;

Column 11, line 44, change "calling" to --called--;

Column 13, line 2, after "16" insert --,--;

Column 14, line 24, change "area-code" to --area code--;

Column 17, line 9, after "formats" insert --,--;

Column 19, line 6, delete "substantially all of said";

Column 19, line 6, after "certain" insert --of said--;

Column 20, lines 6 and 7, delete "and (3) a plurality of live operator attended terminals,";

Column 21, line 49, delete "utilizing" and insert --including--;

Column 21, line 59, after "communication" insert --system--;

UNITED STATES PATENT AND TRADEMARK OFFICE
CERTIFICATE OF CORRECTION

PATENT NO. 5,351,285
DATED September 27, 1994
INVENTOR(S) Ronald A. Katz

It is certified that error appears in the above-indentified patent and that said Letters Patent is hereby corrected as shown below:

Column 22, line 6, after "communication" insert --system--;

Column 24, line 17, before "format" delete "each operating" and insert --said pay to dial--;

Column 25, line 16, delete "and a plurality of live operator attended terminals";

Column 26, lines 2 and 3, delete "with respect to pay to dial formats";

Column 26, line 4, delete "including equipment data";

Column 26, line 30, after "said" insert --plurality of formats includes a--;

Column 26, line 30, delete "formats comprises" and insert --format such as--;

...

UNITED STATES PATENT AND TRADEMARK OFFICE
CERTIFICATE OF CORRECTION

PATENT NO. : 5,351,285
DATED : September 27, 1994
INVENTOR(S) : Ronald A. Katz

It is certified that error appears in the above-indentified patent and that said Letters Patent is hereby corrected as shown below:

Column 26, line 60 and on, insert the following claims:

--68. An interface control system according to claim 1, wherein at least one of said formats is accessible by a plurality of different called numbers.--

--69. An interface control system according to claim 68, wherein said plurality of called numbers include at least one 800 number and at least one pay to dial number.--

--70. An interface control system according to claim 69, wherein said pay to dial number is a 900 number.--

--71. A method for interfacing a telephonic communication system according to claim 19, wherein at least one of said formats is accessible by a plurality of different called numbers.--

...

UNITED STATES PATENT AND TRADEMARK OFFICE
CERTIFICATE OF CORRECTION

PATENT NO. : 5,351,285
DATED : September 27, 1994
INVENTOR(S) : Ronald A. Katz

It is certified that error appears in the above-indentified patent and that said Letters Patent is hereby corrected as shown below:

--72. A method for interfacing a telephonic communication system according to claim 71, wherein said plurality of called numbers include at least one pay to dial number and at least one 800 number.--

--73. A method for interfacing a telephonic communication system according to claim 72, wherein said pay to dial number is a 900 number.--

--74. A method for interfacing a telephonic communication system according to claim 48, wherein said testing step includes testing for a specified number of uses during a specified interval.--

--75. A method for interfacing a telephonic communication system according to claim 62, wherein said use history conditions include a one time only use limitation.--

UNITED STATES PATENT AND TRADEMARK OFFICE
CERTIFICATE OF CORRECTION

PATENT NO. : 5,351,285
DATED : September 27, 1994
INVENTOR(S) : Ronald A. Katz

It is certified that error appears in the above-indentified patent and that said Letters Patent is hereby corrected as shown below:

--76. An interface control system according to claim 65, wherein said call data signals indicate equipment data.--

--77. An interface control system according to claim 65, wherein at least one of said plurality of formats has at least one imposed condition for said remote terminals calling to interface said interface control system.--

--78. A method for interfacing a telephonic communication system according to claim 67, wherein said billing provision data is based on a record word for said pay to dial format which imposes the terms of said caller billing data.--

...

UNITED STATES PATENT AND TRADEMARK OFFICE
CERTIFICATE OF CORRECTION

PATENT NO. : 5,351,285
DATED : September 27, 1994
INVENTOR(S) : Ronald A. Katz

It is certified that error appears in the above-indentified patent and that said Letters Patent is hereby corrected as shown below:

--79. A method for interfacing a telephonic communication system according to claim 78, further comprising the step of:

selectively extracting said billing provision data.--

Signed and Sealed this

Twentieth Day of June, 1995

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO.   : 5,351,285
DATED        : September 27, 1994
INVENTOR(S)  : Ronald A. Katz It is certified that error appears in the above-identified patent and that said Letters Patent is hereby corrected as shown below:

<u>Title page,</u>
Below Item [73], Assignee, please insert the following:
-- Notice:  The portion of the term of this patent subsequent to Dec. 20, 2005 has been disclaimed. --

Signed and Sealed this

First Day of July, 2003

JAMES E. ROGAN
*Director of the United States Patent and Trademark Office*

(12) EX PARTE REEXAMINATION CERTIFICATE (9260th)
United States Patent
Katz

(10) Number: US 5,351,285 C1
(45) Certificate Issued: Sep. 4, 2012

(54) MULTIPLE FORMAT TELEPHONIC INTERFACE CONTROL SYSTEM

(75) Inventor: Ronald A. Katz, Los Angeles, CA (US)

(73) Assignee: General Electric Capital Corporation, Atlanta, GA (US)

Reexamination Request:
No. 90/012,064, Dec. 19, 2011

Reexamination Certificate for:
| | |
|---|---|
| Patent No.: | 5,351,285 |
| Issued: | Sep. 27, 1994 |
| Appl. No.: | 08/047,241 |
| Filed: | Apr. 13, 1993 |

Certificate of Correction issued Jun. 20, 1995.

Certificate of Correction issued Jul. 1, 2003.

Related U.S. Application Data

(63) Continuation of application No. 07/509,691, filed on Apr. 16, 1990, now abandoned, which is a continuation-in-part of application No. 07/260,104, filed on Oct. 20, 1988, now Pat. No. 4,930,150, which is a continuation-in-part of application No. 07/018,244, filed on Feb. 24, 1987, now Pat. No. 4,792, 968, which is a continuation-in-part of application No. 06/753,299, filed on Jul. 10, 1985, now abandoned, application No. 90/012,064, which is a continuation of application No. 07/640,387, filed on Jan. 11, 1991, which is a continuation of application No. 07/335,923, filed on Apr. 10, 1989, which is a continuation of application No. 07/194,258, filed on May 16, 1988, now Pat. No. 4,845,739, which is a continuation-in-part of application No. 07/018,244, which is a continuation-in-part of application No. 06/753,299.

(51) Int. Cl.
| | |
|---|---|
| *H04M 11/00* | (2006.01) |
| *H04M 3/36* | (2006.01) |
| *H04M 3/46* | (2006.01) |
| *H04M 3/493* | (2006.01) |
| *H04M 3/51* | (2006.01) |
| *H04M 3/38* | (2006.01) |
| *H04M 3/50* | (2006.01) |
| *H04M 3/487* | (2006.01) |
| *H04M 3/42* | (2006.01) |
| *H04M 3/346* | (2006.01) |
| *G07C 15/00* | (2006.01) |
| *G07C 11/00* | (2006.01) |
| *H04Q 3/74* | (2006.01) |
| *H04Q 3/66* | (2006.01) |
| *H04Q 3/00* | (2006.01) |
| *H04Q 3/545* | (2006.01) |
| *H04Q 3/72* | (2006.01) |
| *H04Q 3/64* | (2006.01) |
| *A63F 3/08* | (2006.01) |

(52) U.S. Cl. .................. 379/93.14; 379/245; 379/88.09; 379/88.2; 379/88.24; 379/93.02; 379/93.12

(58) Field of Classification Search ........................ None
See application file for complete search history.

(56) References Cited

To view the complete listing of prior art documents cited during the proceeding for Reexamination Control Number 90/012,064, please refer to the USPTO's public Patent Application Information Retrieval (PAIR) system under the Display References tab.

*Primary Examiner* — James Menefee

(57) ABSTRACT

Call data signals actuated by a telephone terminal are provided from a telephone communication system to indicate call data as the called number, the calling number and the calling equipment. The call data signals address related control functions for selectively interfacing a live operator terminal or a multiple format multiple port data processing

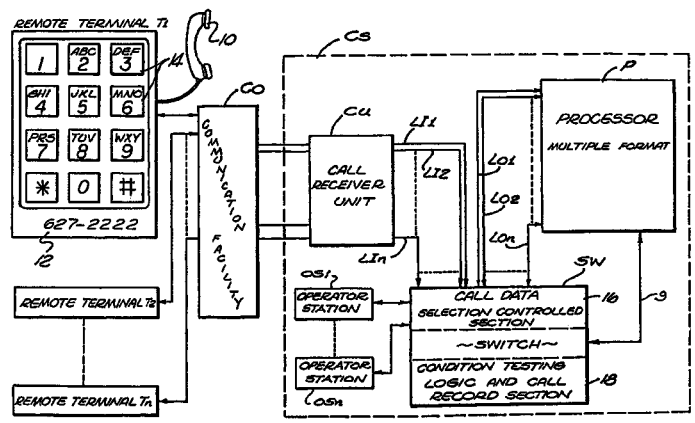

system. The interface connection involves providing a specific format as for automated processing or to prompt an operator. Screening tests and format selection are performed to make a determination. Individual telephone terminals and individual data formats are arranged and interfaced under controlled conditions specified by the call data. Time tests, history tests and demographic tests may be executed in addition to basic selection and qualification tests. Control may be executed from active data storage for assembled control words and record words. Record words for individual calls may be stored along with developed data.

At the time of issuance and publication of this certificate, the patent remains subject to pending reexamination control number 90/008,057 filed May 22, 2006. The claim content of the patent may be subsequently revised if a reexamination certificate issues from the reexamination proceeding.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

Claims 2-79 were not reexamined.

* * * * *

US005351285C2

(12) EX PARTE REEXAMINATION CERTIFICATE (10108th)

United States Patent
Katz

(10) Number: US 5,351,285 C2
(45) Certificate Issued: Apr. 9, 2014

(54) MULTIPLE FORMAT TELEPHONIC INTERFACE CONTROL SYSTEM

(75) Inventor: Ronald A. Katz, Los Angeles, CA (US)

(73) Assignee: General Electric Capital Corporation, Atlanta, GA (US)

Reexamination Request:
No. 90/008,057, May 22, 2006

Reexamination Certificate for:
Patent No.: 5,351,285
Issued: Sep. 27, 1994
Appl. No.: 08/047,241
Filed: Apr. 13, 1993

Reexamination Certificate C1 5,351,285 issued Sep. 4, 2012

Certificate of Correction issued Jun. 20, 1995
Certificate of Correction issued Jul. 1, 2003

Related U.S. Application Data

(63) Continuation-in-part of application No. 07/640,337, filed on Jan. 11, 1991, which is a continuation of (Continued)

(51) Int. Cl.
| | |
|---|---|
| *A63F 3/08* | (2006.01) |
| *G07C 11/00* | (2006.01) |
| *G07C 15/00* | (2006.01) |
| *H04M 3/36* | (2006.01) |
| *H04M 3/38* | (2006.01) |
| *H04M 3/436* | (2006.01) |
| *H04M 3/46* | (2006.01) |
| *H04M 3/493* | (2006.01) |
| *H04M 3/51* | (2006.01) |
| *H04M 11/00* | (2006.01) |
| *H04Q 3/00* | (2006.01) |
| *H04Q 3/545* | (2006.01) |
| *H04Q 3/66* | (2006.01) |
| *H04Q 3/72* | (2006.01) |
| *H04Q 3/74* | (2006.01) |
| *H04Q 3/64* | (2006.01) |
| *H04M 3/42* | (2006.01) |
| *H04M 3/487* | (2006.01) |
| *H04M 3/50* | (2006.01) |

(52) U.S. Cl.
USPC .................. 379/93.14; 379/93.02; 379/93.12; 379/88.2; 379/88.09; 379/88.24; 379/245

(58) Field of Classification Search
None
See application file for complete search history.

(56) References Cited

To view the complete listing of prior art documents cited during the proceeding for Reexamination Control Number 90/008,057, please refer to the USPTO's public Patent Application Information Retrieval (PAIR) system under the Display References tab.

*Primary Examiner* — Erik Kielin

(57) ABSTRACT

Call data signals actuated by a telephone terminal are provided from a telephone communication system to indicate call data as the called number, the calling number and the calling equipment. The call data signals address related control functions for selectively interfacing a live operator terminal or a multiple format multiple port data processing system. The interface connection involves providing a specific format as for automated processing or to prompt an operator. Screening tests and format selection are performed to make a determination. Individual telephone terminals and individual data formats are arranged and interfaced under controlled conditions specified by the call data. Time tests, history tests and demographic tests may be executed in addition to basic selection and qualification tests. Control may be executed from active data storage for assembled control words and record words. Record words for individual calls may be stored along with developed data.

At the time of issuance and publication of this certificate, the patent remains subject to pending reexamination control numbers 90/012,578, 90/012,713, 90/012,723, 90/013,049, and 90/013,133 filed Nov. 13, 2012, Oct. 29, 2012, Nov. 20, 2012, Feb. 7, 2014, and Jan. 24, 2014 respectively. The claim content of the patent may be subsequently revised if a reexamination certificate issues from the reexamination proceedings.

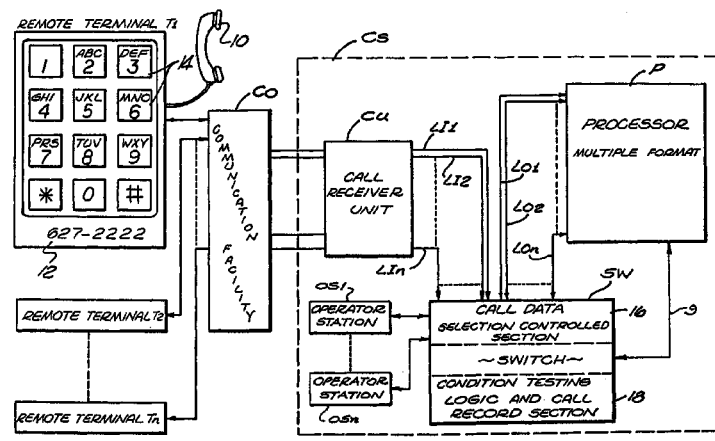

Related U.S. Application Data application No. 07/509,691, filed on Apr. 16, 1990, now abandoned, which is a continuation of application No. 07/335,923, filed on Apr. 10, 1989, which is a continuation-in-part of application No. 07/260,104, filed on Oct. 20, 1988, now Pat. No. 4,930,150, which is a continuation of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned, said application No. 07/509,691 is a continuation-in-part of application No. 07/260,104, which is a continuation-in-part of application No. 07/018,244, which is a continuation-in-part of application No. 06/753,299.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 54 is cancelled.

Claims 1-53 and 55-79 were not reexamined.

* * * * *

US005351285C3

(12) EX PARTE REEXAMINATION CERTIFICATE (10463rd)
United States Patent
Katz

(10) Number: US 5,351,285 C3
(45) Certificate Issued: Jan. 5, 2015

(54) MULTIPLE FORMAT TELEPHONIC INTERFACE CONTROL SYSTEM

(75) Inventor: Ronald A. Katz, Los Angeles, CA (US)

(73) Assignee: General Electric Capital Corporation, Atlanta, GA (US)

Reexamination Request:
No. 90/013,133, Jan. 24, 2014
No. 90/013,049, Feb. 7, 2014

Reexamination Certificate for:
Patent No.: 5,351,285
Issued: Sep. 27, 1994
Appl. No.: 08/047,241
Filed: Apr. 13, 1993

Reexamination Certificate C1 5,351,285 issued Sep. 4, 2012
Reexamination Certificate C2 5,351,285 issued Apr. 9, 2014

Certificate of Correction issued Jun. 20, 1995
Certificate of Correction issued Jul. 1, 2003

Related U.S. Application Data

(63) Continuation of application No. 07/509,691, filed on Apr. 16, 1990, now abandoned, and a
(Continued)

(51) Int. Cl.
G07C 15/00 (2006.01)
G07C 11/00 (2006.01)
(Continued)

(52) U.S. Cl.
USPC ............... 379/93.14; 379/245; 379/88.09; 379/88.2; 379/88.24; 379/93.02; 379/93.12

(58) Field of Classification Search
None
See application file for complete search history.

(56) References Cited

To view the complete listing of prior art documents cited during the proceedings for Reexamination Control Numbers 90/013,133 and 90/013,049, please refer to the USPTO's public Patent Application Information Retrieval (PAIR) system under the Display References tab.

*Primary Examiner* — Ovidio Escalante

(57) ABSTRACT

Call data signals actuated by a telephone terminal are provided from a telephone communication system to indicate call data as the called number, the calling number and the calling equipment. The call data signals address related control functions for selectively interfacing a live operator terminal or a multiple format multiple port data processing system. The interface connection involves providing a specific format as for automated processing or to prompt an operator. Screening tests and format selection are performed to make a determination. Individual telephone terminals and individual data formats are arranged and interfaced under controlled conditions specified by the call data. Time tests, history tests and demographic tests may be executed in addition to basic selection and qualification tests. Control may be executed from active data storage for assembled control words and record words. Record words for individual calls may be stored along with developed data.

At the time of issuance and publication of this certificate, the patent remains subject to pending reexamination control numbers 90/012,578, 90/012,713, and 90/012,723 filed Nov. 13, 2012, Oct. 29, 2012, and Nov. 20, 2012 respectively. The claim content of the patent may be subsequently revised if a reexamination certificate issues from the reexamination proceedings.

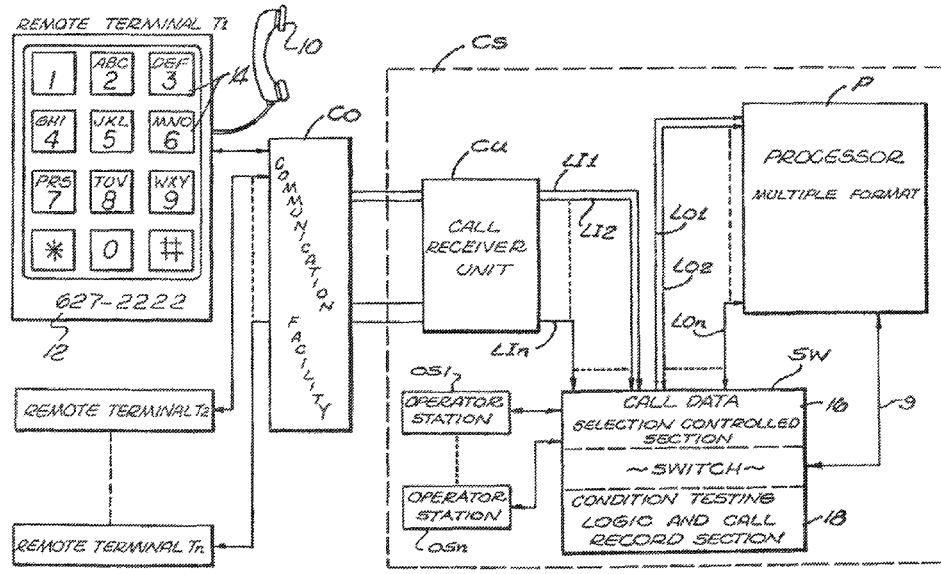

Related U.S. Application Data continuation-in-part of application No. 07/640,337, filed on Jan. 11, 1991, which is a continuation of application No. 07/335,923, filed on Apr. 10, 1989, which is a continuation of application No. 07/194,258, filed on May 16, 1988, now Pat. No. 4,845,739, which is a continuation-in-part of application No. 06/018,244, filed on Feb. 24, 1987, now Pat. No. 4,792,968, which is a continuation-in-part of application No. 06/753,299, filed on Jul. 10, 1985, now abandoned, said application No. 07/509,691 is a continuation-in-part of application No. 07/260,104, filed on Oct. 20, 1988, which is a continuation-in-part of application No. 06/018,244, which is a continuation-in-part of application No. 06/753,299.

(51) Int. Cl.

| | |
|---|---|
| *H04Q 3/74* | (2006.01) |
| *H04Q 3/00* | (2006.01) |
| *H04M 3/36* | (2006.01) |
| *H04M 11/00* | (2006.01) |
| *H04Q 3/66* | (2006.01) |
| *H04M 3/493* | (2006.01) |
| *H04M 3/38* | (2006.01) |
| *H04M 3/487* | (2006.01) |
| *H04M 3/50* | (2006.01) |
| *H04M 3/51* | (2006.01) |
| *H04Q 3/64* | (2006.01) |
| *H04Q 3/72* | (2006.01) |
| *H04Q 3/545* | (2006.01) |
| *H04M 3/46* | (2006.01) |
| *A63F 3/08* | (2006.01) |
| *H04M 3/436* | (2006.01) |
| *H04M 3/42* | (2006.01) |

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 49 is confirmed.

Claim 54 was previously cancelled.

Claims 19 and 71 are cancelled.

Claims 1-18, 20-48, 50-53, 55-70 and 72-79 were not reexamined.

\* \* \* \* \*

US005351285C4

(12) EX PARTE REEXAMINATION CERTIFICATE (10668th)
United States Patent
Katz

(10) Number: US 5,351,285 C4
(45) Certificate Issued: Jul. 21, 2015

(54) MULTIPLE FORMAT TELEPHONIC INTERFACE CONTROL SYSTEM

(75) Inventor: Ronald A. Katz, Los Angeles, CA (US)

(73) Assignee: GENERAL ELECTRIC CAPITAL CORPORATION, Atlanta, GA (US)

Reexamination Request:
No. 90/012,713, Oct. 29, 2012
No. 90/012,578, Nov. 13, 2012
No. 90/012,723, Nov. 20, 2012

Reexamination Certificate for:
Patent No.: 5,351,285
Issued: Sep. 27, 1994
Appl. No.: 08/047,241
Filed: Apr. 13, 1993

Reexamination Certificate C1 5,351,285 issued Sep. 4, 2012
Reexamination Certificate C2 5,351,285 issued Apr. 9, 2014
Reexamination Certificate C3 5,351,285 issued Jan. 5, 2015

Certificate of Correction issued Jun. 20, 1995
Certificate of Correction issued Jul. 1, 2003

Related U.S. Application Data

(63) Continuation of application No. 07/509,691, filed on Apr. 16, 1990, now abandoned, which is a (Continued)

(51) Int. Cl.
*G07C 15/00* (2006.01)
*G07C 11/00* (2006.01)

(Continued)

(52) U.S. Cl.
CPC ............... *H04Q 3/665* (2013.01); *G07C 11/00* (2013.01); *G07C 15/005* (2013.01); *G07C 15/006* (2013.01); *H04M 3/36* (2013.01); *H04M 3/38* (2013.01); *H04M 3/46* (2013.01); *H04M 3/493* (2013.01); *H04M 3/51* (2013.01); *H04M 11/00* (2013.01); *H04Q 3/002* (2013.01); *H04Q 3/5455* (2013.01); *H04Q 3/54533* (2013.01); *H04Q 3/54591* (2013.01); *H04Q 3/72* (2013.01); *H04Q 3/74* (2013.01); *A63F 2003/086* (2013.01); *H04M 3/42059* (2013.01); *H04M 3/42102* (2013.01); *H04M 3/436* (2013.01); *H04M 2201/40* (2013.01); *H04M 2203/2016* (2013.01); *H04M 2242/22* (2013.01); *H04Q 2213/1309* (2013.01); *H04Q 2213/1316* (2013.01); *H04Q 2213/1322*(2013.01);

(Continued)

(58) Field of Classification Search
None
See application file for complete search history.

(56) References Cited

To view the complete listing of prior art documents cited during the proceedings for Reexamination Control Numbers 90/012,713, 90/012,578 and 90/012,723, please refer to the USPTO's public Patent Application Information Retrieval (PAIR) system under the Display References tab.

*Primary Examiner* — Stephen J Ralis

(57) ABSTRACT

Call data signals actuated by a telephone terminal are provided from a telephone communication system to indicate call data as the called number, the calling number and the calling equipment. The call data signals address related control functions for selectively interfacing a live operator terminal or a multiple format multiple port data processing system. The interface connection involves providing a specific format as for automated processing or to prompt an operator. Screening tests and format selection are performed to make a determination. Individual telephone terminals and individual data formats are arranged and interfaced under controlled conditions specified by the call data. Time tests, history tests and demographic tests may be executed in addition to basic selection and qualification tests. Control may be executed from active data storage for assembled control words and record words. Record words for individual calls may be stored along with developed data.

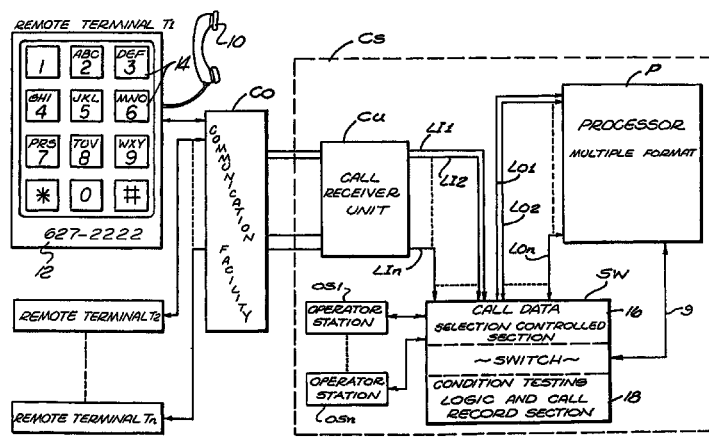

Related U.S. Application Data continuation-in-part of application No. 07/260,104, filed on Oct. 20, 1988, now Pat. No. 4,930,150, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned, which is a continuation of application No. 07/640,387, filed on Jan. 11, 1991, which is a continuation of application No. 07/335,923, filed on Apr. 10, 1989, which is a continuation of application No. 07/194,258, filed on May 16, 1988, now Pat. No. 4,845,739, which is a continuation-in-part of application No. 06/018,244, filed on Mar. 7, 1979, now Pat. No. 4,233,562.

(51) Int. Cl.

| | |
|---|---|
| *H04Q 3/74* | (2006.01) |
| *H04Q 3/00* | (2006.01) |
| *H04M 3/36* | (2006.01) |
| *H04M 11/00* | (2006.01) |
| *H04Q 3/66* | (2006.01) |
| *H04M 3/493* | (2006.01) |
| *H04M 3/38* | (2006.01) |
| *H04M 3/487* | (2006.01) |
| *H04M 3/50* | (2006.01) |
| *H04M 3/51* | (2006.01) |
| *H04Q 3/64* | (2006.01) |
| *H04Q 3/72* | (2006.01) |
| *H04Q 3/545* | (2006.01) |
| *H04M 3/46* | (2006.01) |
| *A63F 3/08* | (2006.01) |
| *H04M 3/436* | (2006.01) |
| *H04M 3/42* | (2006.01) |

(52) U.S. Cl.
CPC ............ *H04Q 2213/1328* (2013.01); *H04Q 2213/1332* (2013.01); *H04Q 2213/13034* (2013.01); *H04Q 2213/1337* (2013.01); *H04Q 2213/13072* (2013.01); *H04Q 2213/13091* (2013.01); *H04Q 2213/13093* (2013.01); *H04Q 2213/13095* (2013.01); *H04Q 2213/13096* (2013.01); *H04Q 2213/13097* (2013.01); *H04Q 2213/13103* (2013.01); *H04Q 2213/13106* (2013.01); *H04Q 2213/13107* (2013.01); *H04Q 2213/13173* (2013.01); *H04Q 2213/13175* (2013.01); *H04Q 2213/13178* (2013.01); *H04Q 2213/13204* (2013.01); *H04Q 2213/13256* (2013.01); *H04Q 2213/13349* (2013.01); *H04Q 2213/13375* (2013.01); *H04Q 2213/13376* (2013.01); *H04Q 2213/13377* (2013.01)

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 19, 54 and 71 were previously cancelled.

Claims 1-3 and 61 are cancelled.

Claims 4-18, 20-53, 55-60, 62-70 and 72-79 were not reexamined.

* * * * *